US011875220B2

(12) United States Patent
Tu et al.

(10) Patent No.: US 11,875,220 B2
(45) Date of Patent: Jan. 16, 2024

(54) METHOD, APPARATUS, AND STORAGE MEDIUM FOR GENERATING NETWORK REPRESENTATION FOR NEURAL NETWORK

(71) Applicant: Tencent Technology (Shenzhen) Company Limited, Shenzhen (CN)

(72) Inventors: Zhaopeng Tu, Shenzhen (CN); Baosong Yang, Shenzhen (CN); Tong Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 742 days.

(21) Appl. No.: 17/069,609

(22) Filed: Oct. 13, 2020

(65) Prior Publication Data

US 2021/0042603 A1    Feb. 11, 2021

Related U.S. Application Data

(63) Continuation of application No. PCT/CN2019/100212, filed on Aug. 12, 2019.

(30) Foreign Application Priority Data

Sep. 4, 2018    (CN) .......................... 201811027795.X

(51) Int. Cl.
*G06N 3/04*    (2023.01)
(52) U.S. Cl.
CPC ....................................... *G06N 3/04* (2013.01)
(58) Field of Classification Search
CPC ........................................................ G06N 3/04
See application file for complete search history.

(56) References Cited

U.S. PATENT DOCUMENTS 6,081,579 A * 6/2000 Nagano ................. G01N 23/20
378/54
7,496,546 B2 * 2/2009 Hoya ....................... G06N 3/04
706/26
(Continued)

FOREIGN PATENT DOCUMENTS

CN        104765728 B      7/2017
CN        107180247 A      9/2017
(Continued)

OTHER PUBLICATIONS

Chinese International Search Report and Written Opinion for PCT Application No. PCT/CN2019/100212.
(Continued)

*Primary Examiner* — David E Choi
(74) *Attorney, Agent, or Firm* — Crowell & Moring LLP

(57) ABSTRACT

The present disclosure describes a method, apparatus, and storage medium for generating network representation for a neural network. The method includes obtaining a source-side vector sequence corresponding to an input sequence. The method further includes performing linear transformation on the source-side vector sequence, to obtain a request vector sequence, a key vector sequence, and a value vector sequence corresponding to the source-side vector sequence; calculating a logical similarity between the request vector sequence and the key vector sequence; constructing a local strength matrix according to the request vector sequence; performing nonlinear transformation based on the logical similarity and the local strength matrix, to obtain a local strength attention weight distribution corresponding to elements in the input sequence; and fusing value vectors in the value vector sequence according to the local strength attention weight distribution, to obtain a network representation sequence corresponding to the input sequence.

20 Claims, 11 Drawing Sheets

(56) References Cited

U.S. PATENT DOCUMENTS

| | | | |
|---|---|---|---|
| 2018/0240013 A1 | 8/2018 | Strope et al. | |
| 2020/0193288 A1* | 6/2020 | Li | G06N 3/045 |
| 2021/0042603 A1* | 2/2021 | Tu | G06N 3/04 |

FOREIGN PATENT DOCUMENTS

| | | | | |
|---|---|---|---|---|
| CN | 106339564 B | * | 11/2017 | G06F 17/18 |
| CN | 107783960 A | | 3/2018 | |
| CN | 107797992 A | | 3/2018 | |
| CN | 108256172 A | * | 7/2018 | G06F 30/13 |
| CN | 108334499 A | | 7/2018 | |
| CN | 109034378 A | | 12/2018 | |
| CN | 106096640 B | * | 3/2019 | G06K 9/6223 |
| CN | 106056526 B | * | 4/2019 | G06T 1/00 |
| CN | 107345860 B | * | 5/2019 | G01M 17/08 |
| CN | 107025219 B | * | 7/2019 | G06F 17/2785 |
| CN | 108537822 B | * | 4/2020 | G06T 7/223 |
| CN | 106571135 B | * | 6/2020 | |
| CN | 108828533 B | * | 12/2021 | G01S 7/292 |
| CN | 108026556 B | * | 1/2023 | C07K 14/24 |

OTHER PUBLICATIONS

Daniluk, Michal et al., "Frustratingly Short Attention Spans in Neural Language Modeling", Department of Computer Science, University College London, Published as conference paper at ICLR 2017.

Office Action issued on Chinese Application No. 201811027795.X dated Sep. 9, 2022, 5 pages.

Extended European Search Report of European Application 19857335.4 dated Oct. 14, 2021, 8 pages.

Vaswani, Ashish, et al., "Attention is All You Need", 31$^{st}$ Conference on Neural Information Processing Systems (NIPS 2017), Long Beach, CA, USA, 11 pages.

Office Action issued on Japanese application 2020-551812 dated Nov. 22, 2021, with summary 5 pages.

* cited by examiner

METHOD, APPARATUS, AND STORAGE MEDIUM FOR GENERATING NETWORK REPRESENTATION FOR NEURAL NETWORK

RELATED APPLICATION

This application is a continuation application of PCT International Patent Application No. PCT/CN2019/100212, filed on Aug. 12, 2019, which claims priority to Chinese Patent Application No. 201811027795.X, filed on Sep. 4, 2018, both of which are incorporated herein by reference in their entireties.

FIELD OF THE TECHNOLOGY

This application relates to the field of computer technologies, and in particular, to a network representation generating method and apparatus for a neural network, a storage medium, and a device.

BACKGROUND OF THE DISCLOSURE

An attention mechanism is a method of establishing a model for a dependence between hidden states of an encoder and a decoder in a neural network. The attention mechanism is widely applied to tasks of deep learning-based natural language processing (NLP).

A self-attention network (SAN) is a neural network model based on a self-attention mechanism, belongs to one type of attention models, and can calculate an attention weight for each element pair in an input sequence, so that a long-distance dependence can be captured, and network representations corresponding to elements are not affected by distances between the elements. However, the SAN fully considers each element in the input sequence, and therefore needs to calculate attention weights between each element and all elements. This disperses a distribution of the weights to some extent, and further weakens a connection between the elements.

The present disclosure describes various embodiments for generating network representation for a neural network, addressing at least some of the issues/problems discussed above.

SUMMARY

Based on this, it is necessary to provide a network representation generating method and apparatus for a neural network, a storage medium, and a device, to resolve the technical problem that an existing self-attention neural network considers that attention weights between each element and all elements weaken a connection between the elements.

The present disclosure describes a method for generating network representation for a neural network. The method includes obtaining, by a device, a source-side vector sequence corresponding to an input sequence. The device includes a memory storing instruction and a processor in communication with the memory. The method further includes performing, by the device, linear transformation on the source-side vector sequence, to separately obtain a request vector sequence, a key vector sequence, and a value vector sequence corresponding to the source-side vector sequence; calculating, by the device, a logical similarity between the request vector sequence and the key vector sequence; constructing, by the device, a local strength matrix according to the request vector sequence; performing, by the device, nonlinear transformation based on the logical similarity and the local strength matrix, to obtain a local strength attention weight distribution corresponding to elements in the input sequence; and fusing, by the device, value vectors in the value vector sequence according to the local strength attention weight distribution, to obtain a network representation sequence corresponding to the input sequence.

The present disclosure describes an apparatus for generating network representation for a neural network. The apparatus includes a memory storing instructions; and a processor in communication with the memory. When the processor executes the instructions, the processor is configured to cause the apparatus to: obtain a source-side vector sequence corresponding to an input sequence, perform linear transformation on the source-side vector sequence, to separately obtain a request vector sequence, a key vector sequence, and a value vector sequence corresponding to the source-side vector sequence, calculate a logical similarity between the request vector sequence and the key vector sequence, construct a local strength matrix according to the request vector sequence, perform nonlinear transformation based on the logical similarity and the local strength matrix, to obtain a local strength attention weight distribution corresponding to elements in the input sequence, and fuse value vectors in the value vector sequence according to the local strength attention weight distribution, to obtain a network representation sequence corresponding to the input sequence.

The present disclosure describes a non-transitory computer readable storage medium storing computer readable instructions. The computer readable instructions, when executed by a processor, are configured to cause the processor to perform: obtaining a source-side vector sequence corresponding to an input sequence; performing linear transformation on the source-side vector sequence, to separately obtain a request vector sequence, a key vector sequence, and a value vector sequence corresponding to the source-side vector sequence; calculating a logical similarity between the request vector sequence and the key vector sequence; constructing a local strength matrix according to the request vector sequence; performing nonlinear transformation based on the logical similarity and the local strength matrix, to obtain a local strength attention weight distribution corresponding to elements in the input sequence; and fusing value vectors in the value vector sequence according to the local strength attention weight distribution, to obtain a network representation sequence corresponding to the input sequence.

According to an aspect, a network representation generating method for a neural network is provided, applied to a computer device, the method including:

obtaining a source-side vector representation sequence corresponding to an input sequence;

performing linear transformation on the source-side vector representation sequence, to separately obtain a request vector sequence, a key vector sequence and a value vector sequence corresponding to the source-side vector representation sequence;

calculating a logical similarity between the request vector sequence and the key vector sequence;

constructing a locally strengthened matrix according to the request vector sequence;

performing nonlinear transformation based on the logical similarity and the locally strengthened matrix, to obtain a locally strengthened attention weight distribution corresponding to the elements; and fusing value vectors in the value vector sequence according to the attention weight distribution, to obtain a network representation sequence corresponding to the input sequence.

According to another aspect, a network representation generating apparatus for a neural network is provided, the apparatus including:

an obtaining module, configured to obtain a source-side vector representation sequence corresponding to an input sequence;

a linear transformation module, configured to perform linear transformation on the source-side vector representation sequence, to separately obtain a request vector sequence, a key vector sequence and a value vector sequence corresponding to the source-side vector representation sequence;

a logical similarity calculation module, configured to calculate a logical similarity between the request vector sequence and the key vector sequence;

a locally strengthened matrix construction module, configured to construct a locally strengthened matrix according to the request vector sequence;

an attention weight distribution determining module, configured to perform nonlinear transformation based on the logical similarity and the locally strengthened matrix, to obtain a locally strengthened attention weight distribution corresponding to the elements; and a fusion module, configured to fuse value vectors in the value vector sequence according to the attention weight distribution, to obtain a network representation sequence corresponding to the input sequence.

According to still another aspect, a computer-readable storage medium is provided, storing a computer program, the computer program, when executed by a processor, causing the processor to perform the operations of the foregoing network representation generating method for a neural network.

According to yet another aspect, a computer device is provided, including a memory and a processor, the memory storing a computer program, the computer program, when executed by the processor, causing the processor to perform the operations of the foregoing network representation generating method for a neural network.

According to the network representation generating method and apparatus for a neural network, the storage medium, and the device, the locally strengthened matrix is constructed based on the request vector sequence corresponding to the input sequence, so that attention weights can be assigned in the locally strengthened range, to strengthen local information. After the linear transformation is performed on the source-side vector representation sequence corresponding to the input sequence, the request vector sequence, the key vector sequence, and the value vector sequence may be obtained, the logical similarity may be obtained according to the request vector sequence and the key vector sequence, and then the nonlinear transformation is performed based on the logical similarity and the locally strengthened matrix, to obtain the locally strengthened attention weight distribution, so as to correct original attention weights. Then, a weighted sum is performed on the value vector sequence according to the locally strengthened attention weight distribution, so that a network representation sequence with the strengthened local information can be obtained. The obtained network representation sequence can not only strengthen local information, but also reserve a connection between long-distance elements in the input sequence.

DESCRIPTION OF EMBODIMENTS

To make the objectives, technical solutions, and advantages of this application clearer and more understandable, this application is further described in detail below with reference to the accompanying drawings and the embodiments. The specific embodiments described herein are merely used for describing this application, but are not intended to limit this application.

Figure 1:
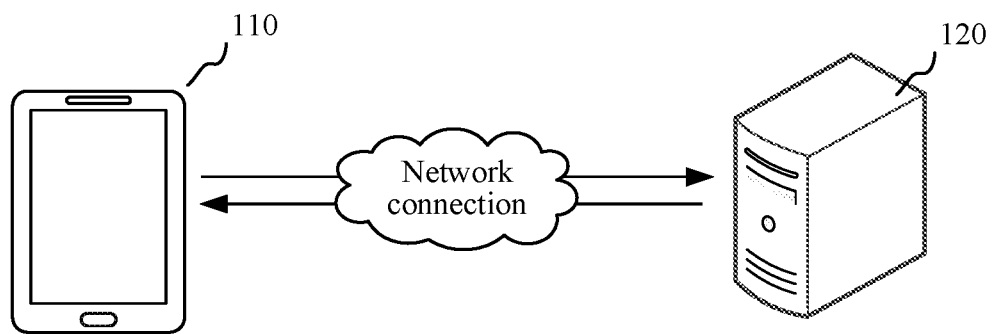
FIG. 1 is a diagram of an application environment of a network representation generating method for a neural network in an embodiment.

FIG. 1 is a diagram of an application environment of a network representation generating method for a neural network in an embodiment. Referring to FIG. 1, the network representation generating method for a neural network is applied to a network representation generating system for a neural network. The network representation generating system for a neural network includes a terminal 110 and a computer device 120. The terminal 110 and the computer device 120 are connected through Bluetooth, a universal serial bus (USB) or a network. The terminal 110 may transmit a to-be-processed input sequence to the computer device 120 in real time or non-real time. The computer device 120 is configured to: receive the input sequence, and output a corresponding network representation sequence after transforming the input sequence. The terminal 110 may be a desktop terminal or a mobile terminal, and the mobile terminal may be at least one of a mobile phone, a tablet computer, a notebook computer, or the like. The computer device 120 may be an independent server or terminal, or may be a server cluster formed by a plurality of servers, or may be a cloud server providing basic cloud computing services such as a cloud server service, a cloud database service, a cloud storage service, and a content delivery network (CDN) service.

The foregoing application environment is merely an example. In some embodiments, the computer device 120 may directly obtain the input sequence directly without the terminal 110. For example, when the computer device is a mobile phone, the mobile phone may directly obtain the input sequence (for example, a sequence formed by words in an instant text message), transform the input sequence by using a network representation generating apparatus for a neural network configured on the mobile phone, and output a network representation sequence corresponding to the input sequence.

Figure 2:
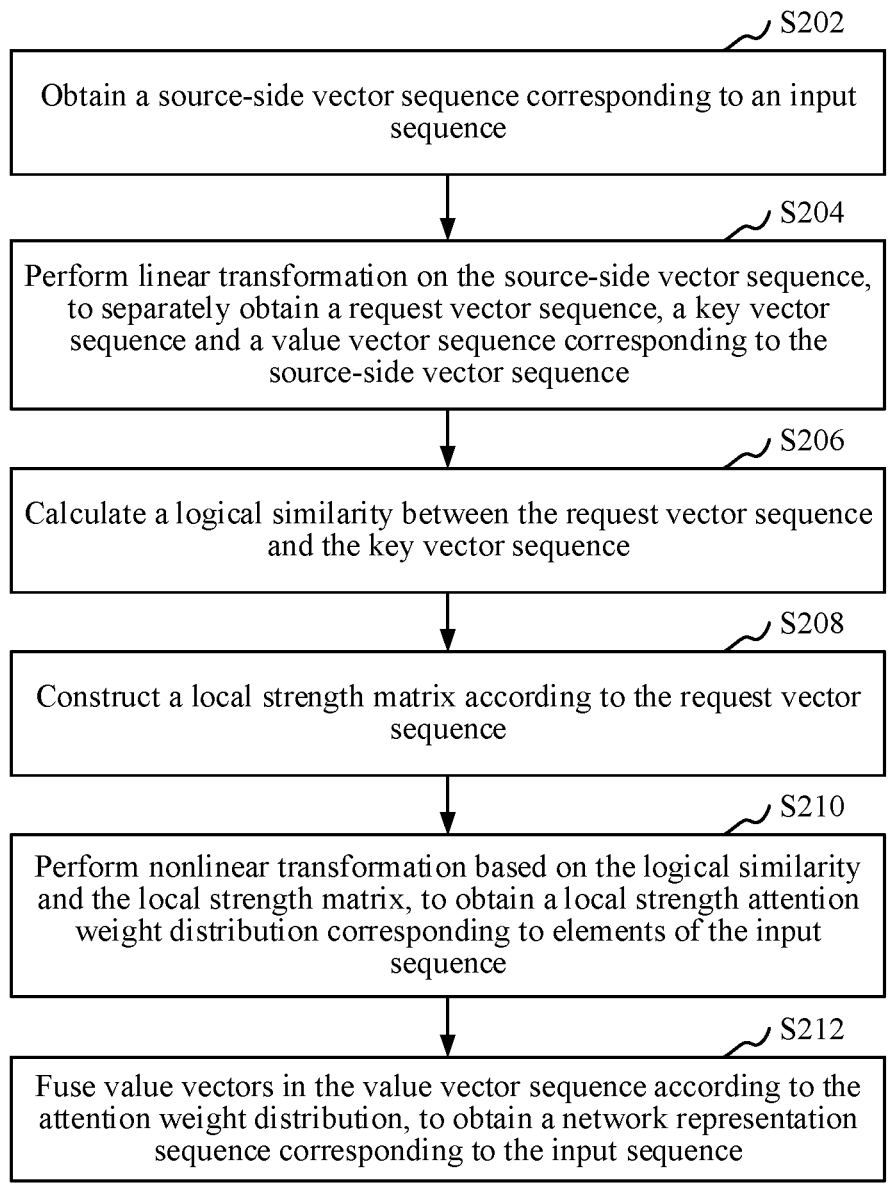
FIG. 2 is a schematic flowchart of a network representation generating method for a neural network in an embodiment.

As shown in FIG. 2, in an embodiment, a network representation generating method for a neural network is provided. In this embodiment, description is made mainly by using an example in which the method is applied to the computer device 120 in FIG. 1. Referring to FIG. 2, the network representation generating method for a neural network may include the following steps:

S202. Obtain a source-side vector sequence corresponding to an input sequence.

The input sequence is a sequence to be transformed to obtain a corresponding network representation sequence. The input sequence includes a sequentially arranged element set, and an input sequence including I elements is used as an example. The input sequence may be represented by $X=\{x_1, x_2, x_3, \ldots, x_I\}$, an input sequence length is I, and I is a positive integer.

In a scenario that the input sequence needs to be translated, the input sequence may be a word sequence corresponding to a to-be-translated text, and elements in the input sequence are words in the word sequence. If the to-be-translated text is Chinese text, the word sequence may be a sequence formed by arranging, according to the word sequence, words obtained after word segmentation is performed on the to-be-translated text. If the to-be-translated text is English text, the word sequence is a sequence formed by arranging words according to the word sequence. For example, if to-be-translated text is "Bush held a talk with Sharon", a corresponding input sequence X is "Bush, held, a, talk, with, Sharon".

The source-side vector sequence is a sequence formed by corresponding source-side vector representations of all elements in the input sequence. Each vector representation in the source-side vector sequence is in a one-to-one correspondence with each element in the input sequence, and the source-side vector sequence may be represented by $Z=\{z_1, z_2, z_3, \ldots, z_I\}$.

The computer device may transform the each element in the input sequence into a vector of a fixed length (that is, word embedding). In an embodiment, the network representation generating method for a neural network is applied to a neural network model. In this case, the computer device may transform the each element in the input sequence into a corresponding vector through a first layer of the neural network model. For example, the computer device transforms an $i^{th}$ element $x_i$ in the input sequence into a d-dimensional column vector, that is, $z_i$, and then combines vectors corresponding to the elements in the input sequence, to obtain the source-side vector sequence corresponding to the input sequence, that is, a vector sequence formed by I d-dimensional column vectors. d is a positive integer. Certainly, the computer device may alternatively receive the source-side vector sequence corresponding to the input sequence transmitted by another device. $z_i$ and all column vectors mentioned below may be row vectors, and for ease of describing the calculation process, this specification uniformly uses the column vectors for description.

S204. Perform linear transformation on the source-side vector sequence, to separately obtain a request vector sequence, a key vector sequence and a value vector sequence corresponding to the source-side vector sequence.

The linear transformation may be mapping a vector that belongs to one vector space to another vector space. The vector space is a set formed by a plurality of vectors of the same dimension. In an embodiment, the computer device may perform linear transformation on the source-side vector sequence through three different learnable parameter matrices, so that the source-side vector sequence is separately mapped to three different vector spaces, to obtain the request vector sequence, the key vector sequence and the value vector sequence corresponding to the source-side vector sequence.

In an embodiment, the network representation generating method for a neural network is applied to a self-attention network (SAN)-based model. In this case, each of the request vector sequence, the key vector sequence and the value vector sequence is obtained by performing the linear transformation on the source-side vector sequence corresponding to the input sequence at a source side. In another embodiment, the network representation generating method for a neural network is applied to a neural network model including an encoder-decoder structure. In this case, the key vector sequence and the value vector sequence are obtained by an encoder by encoding the source-side vector sequence corresponding to the input sequence. That is, the key vector sequence and the value vector sequence are outputs of the encoder. However, the request vector sequence is an input of a decoder, for example, may be a target-side vector sequence, and the target-side vector sequence may be represented by vectors corresponding to elements in an output sequence outputted by the decoder.

In an embodiment, the computer device may perform linear transformation on a source-side vector sequence Z by using three different learnable parameter matrices $W^Q$, $W^K$, and $W^V$, to obtain a request vector sequence Q, a key vector sequence K and a value vector sequence V by using the following formulas:

$$Q = Z \cdot W^Q;$$

$$K = Z \cdot W^K; \text{ and}$$

$$V = Z \cdot W^V.$$

The input sequence $X=\{x_1, x_2, x_3, \ldots, x_I\}$ includes I elements. Each element in the source-side vector sequence $Z=\{z_1, z_2, z_3, \ldots, z_I\}$ is a d-dimensional column vector, that is, Z is a vector sequence formed by I d-dimensional column vectors, and may be denoted by a matrix I×d. The learnable parameter matrices $W^Q$, $W^K$, and $W^V$ are matrices d×d. The request vector sequence Q, the key vector sequence K, and the value vector sequence V is the matrix I×d.

S206. Calculate a logical similarity between the request vector sequence and the key vector sequence.

The logical similarity is used for measuring a similarity between the each element in the input sequence and another element in the input sequence. During generating of a network representation corresponding to each element, a corresponding attention weight may be assigned, based on the similarity, to a value vector corresponding to the another element in the input sequence, so that the network representation corresponding to the outputted each element considers the connection between the element and the another element, and the generated network representation can more accurately represent a feature of each element, and contains more abundant information.

In an embodiment, the network representation generating method for a neural network is applied to a neural network model including an encoder-decoder structure. In this case, the request vector sequence is a target-side vector sequence, the logical similarity obtained through calculation is used for representing a similarity between the target-side vector sequence and the key vector sequence corresponding to the input sequence, and a corresponding attention weight is assigned, based on the similarity, to the value vector sequence corresponding to the input sequence, so that the network representation of the each element outputted by the source side can consider the effect of the target-side vector sequence inputted by a target side.

In an embodiment, the computer device may calculate a logical similarity matrix E between the request vector sequence Q and the key vector sequence K by using a cosine similarity formula, that is, $$E = \frac{Q \cdot K^T}{\sqrt{d}}. \qquad \text{formula (1)}$$

$K^T$ represents a transposed matrix of the key vector sequence K. d is a dimension of which each element $x_i$ in the input sequence is transformed into a source-side vector representation $z_i$, is also a dimension of the network representation corresponding to $x_i$, and is also a dimension of a network hidden state vector. Divided by $\sqrt{d}$ in the foregoing formula is to reduce an inner product, and increase a calculation speed.

The following describes a calculation process of the logical similarity matrix E.

$Q=(q_1, q_2, \ldots, q_i, \ldots, q_I)$, and $K=(k_1, k_2, \ldots, k_i, \ldots, k_I)$. $q_i$ and $k_i$ are d-dimensional column vectors, and are respectively a request vector and a key vector corresponding to the source-side vector representation $z_i$. In the logical similarity matrix $E=(e_1, e_2, \ldots, e_i, \ldots, e_I)$, each element of $e_i$ represents a logical similarity between a request vector $q_i$ corresponding to the source-side vector representation $z_i$ and a key vector $k_1, k_2, \ldots, k_i, \ldots, k_I$ corresponding to all elements in the input sequence, where $e_i$ is an element of an $i^{th}$ column of E, $e_i$ is an I-dimensional column vector, and a calculation formula is that $$e_i = \frac{1}{\sqrt{d}}(q_i \cdot k_1^T, q_i \cdot k_2^T, q_i \cdot k_3^T, \ldots, q_i \cdot k_I^T).$$

Substantially, $e_i$ implies a connection between two elements in I sets of element pairs formed by all elements $x_1, x_2, \ldots, x_i, \ldots, x_I$ in the input sequence and the $i^{th}$ element $x_i$. The logical similarity matrix E is a matrix I×I, and the logical similarity matrix E is as follows:

$$E = \frac{1}{\sqrt{d}} \begin{Bmatrix} q_1 \cdot k_1^T & q_2 \cdot k_1^T & q_3 \cdot k_1^T & \ldots & q_I \cdot k_1^T \\ q_1 \cdot k_2^T & q_2 \cdot k_2^T & q_3 \cdot k_2^T & \ldots & q_I \cdot k_2^T \\ q_1 \cdot k_3^T & q_2 \cdot k_3^T & q_3 \cdot k_3^T & \ldots & q_I \cdot k_3^T \\ \ldots & \ldots & \ldots & \ldots & \ldots \\ q_1 \cdot k_I^T & q_2 \cdot k_I^T & q_3 \cdot k_I^T & \ldots & q_I \cdot k_I^T \end{Bmatrix}$$

S208. Construct a local strength matrix according to the request vector sequence.

Each element of a column vector in the local strength matrix represents a strong and weak connection between two elements in the input sequence. During generating of the network representation corresponding to the each element in the input sequence, the effect on the network representation caused by an element that has a stronger connection with a current element and that is the another element in the input sequence may be strengthened through the local strength matrix, so that the effect on the network representation caused by an element that has a weaker connection with the current element can be relatively weakened. When it is considered that the another element affects the network representation of the current element, the local strength matrix may make a considered scope be limited to local elements, but not all the elements in the input sequence. In this way, during assignment, the attention weights tend to be assigned in the local elements, and a magnitude of the attention weight assigned to a value vector corresponding to a specific element in the local elements is related to a strong or weak connection between the element and the current element. That is, a higher attention weight is assigned to a value vector corresponding to the element that has a stronger connection with the current element.

For example, an input sequence is "Bush held a talk with Sharon". In the SAN model, when a network representation corresponding to an element "Bush" is outputted, value vectors respectively corresponding to all elements "Bush", "held", "a", "talk", "with", and "Sharon" in the input sequence are fully considered, and corresponding attention weights are assigned to the value vectors respectively corresponding to all the elements. This disperses a distribution of the attention weights to some extent, and further weakens a connection between the element "Bush" and an adjacent element.

According to the network representation generating method for a neural network in this embodiment, when the network representation corresponding to the element "Bush" is outputted, the attention weight may be assigned within a locally strengthened range. When the network representation corresponding to the element "Bush" is outputted, if a strong connection exists between the element "Bush" and the element "hold", a relatively high attention weight is assigned to a value vector corresponding to the element "hold". In the same way as the "held", the "a talk" in the local elements that falls within the locally strengthened range corresponding to the element "Bush" is also noted, and therefore is assigned with a relatively high attention weight. In this way, information (each value vector) corresponding to words in the phrase "held a talk" is captured and is associated with the element "Bush", so that the outputted network representation of the element "Bush" can express local information, and reserve a dependence between the element "Bush" and a farther element.

Therefore, when generating the network representation corresponding to the each element, the computer device needs to determine a locally strengthened range corresponding to the current element, so that the assignment of the attention weight corresponding to the current element is limited within the locally strengthened range.

In an embodiment, the locally strengthened range may be determined according to two variables: a center point of the locally strengthened range and a window size of the locally strengthened range. The center point refers to a position in the input sequence of an element to which the highest attention weight is assigned during generating of the network representation of the current element. The window size refers to a length of the locally strengthened range, and determines the quantity of elements in which the attention weights are centrally assigned. In this case, elements related to the center point as a center and the window size as a span are the locally strengthened range. Because a locally strengthened range corresponding to each element is related to the each element itself, and corresponds to the each element, and the each element is not fixed in a specific range, the generated network representation of the each element may flexibly capture abundant context information.

In an embodiment, the computer device may determine a locally strengthened range corresponding to elements according to the center point and the window size. The step may include: using the center point as an expectation of a Gaussian distribution, and using the window size as a variance of the Gaussian distribution; determining a locally strengthened range according to the Gaussian distribution determined according to an average value and the variance; and calculating strong and weak connections between two elements based on the determined locally strengthened range, to obtain a local strength matrix. The strong and weak connections between every two elements are obtained by using the following formula:

$$G_{ij} = -\frac{2(j-P_i)^2}{D_i^2} \quad \text{formula (2)}$$

$G_{ij}$ represents a strong and weak connection between a $j^{th}$ element in the input sequence and a center point $P_i$ corresponding to an $i^{th}$ element, and $G_{ij}$ is a value of a $j^{th}$ element of an $i^{th}$ column vector in a local strength matrix G; $P_i$ represents a center point of a locally strengthened range corresponding to the $i^{th}$ element; and $D_i$ represents a window size of the locally strengthened range corresponding to the $i^{th}$ element.

It can be learned from the formula (2) that, the local strength matrix G is a matrix I×I, including I column vectors, and a dimension of each column vector is I. A value of each element in the $i^{th}$ column vector of the local strength matrix G is determined based on the locally strengthened range corresponding to the $i^{th}$ element in the input sequence. The formula (2) is a function that is symmetric about the center point $P_i$, and the numerator represents a distance between the $j^{th}$ element in the input sequence and the center point $P_i$ corresponding to the $i^{th}$ element. A closer distance indicates a greater, and it indicates that a stronger connection exists between the $j^{th}$ element and the $i^{th}$ element. On the contrary, a farther distance indicates a weaker connection between the $j^{th}$ element and the $i^{th}$ element. That is, during generating of a network representation corresponding to the $i^{th}$ element, the attention weights are centrally assigned among elements close to the center point $P_i$.

The calculating $G_{ij}$ using the formula (2) according to the Gaussian distribution transformation is merely an example. In some embodiments, after the center point and the window size corresponding to the locally strengthened range are determined, the center point may be used as an expectation, the window size may be used as a variance, and a value of $G_{ij}$ is calculated through another distribution having the expectation and the variance, such as a Poisson distribution or a binomial distribution, to obtain the local strength matrix G.

S210. Perform nonlinear transformation based on the logical similarity and the local strength matrix, to obtain a local strength attention weight distribution corresponding to elements. In one implementation, the elements may refer to elements in the input sequence.

The logical similarity represents a similarity between two elements in each element pair in the input sequence, the local strength matrix represents the strong and weak connection between the two elements in each element pair in the input sequence, and a combination of both may be used for calculating the local strength attention weight distribution.

In an embodiment, the performing nonlinear transformation based on the logical similarity and the local strength matrix, to obtain a local strength attention weight distribution corresponding to elements may include: correcting the logical similarity according to the local strength matrix, to obtain a locally strengthened logical similarity; and performing normalization on the locally strengthened logical similarity, to obtain the local strength attention weight distribution corresponding to the elements.

After obtaining the logical similarity and the strong and weak connection between the two elements in each element pair in the input sequence, the computer device may correct the logical similarity through the strong and weak connection, to obtain the locally strengthened logical similarity. In an embodiment, the logical similarity matrix E including logical similarities respectively corresponding to all element pairs may be added to the local strength matrix G including strong and weak connections respectively corresponding to all element pairs, to correct the logical similarity matrix (also referred to as an offset), and normalization is performed on logical similarity vectors in the corrected logical similarity matrix, to obtain the local strength attention weight distribution.

The normalization on the logical similarity vectors in the corrected logical similarity matrix is normalization by using each column vector $e'_i$ as a unit. That is, a value range of each element in the column vector $e'_i$ is located between (0,1), and a sum of all the elements is 1. The normalization on the column vectors $e'_i$ can highlight a maximum value of the column vectors, and suppress other components far lower than the maximum value, so that the local strength attention weight distribution corresponding to the $i^{th}$ element in the input sequence can be obtained.

In an embodiment, the local strength attention weight distribution A may be calculated by using the following formula:

$$A = \text{softmax}(E+G).$$

The softmax function is a normalization function. A is a matrix including an attention weight distribution corresponding to each element in the input sequence. $A = \{\alpha_1, \alpha_2, \alpha_3, \ldots \alpha_I\}$, A includes I I-dimensional column vectors, and an $i^{th}$ element $\alpha_i$ in A represents an attention weight distribution corresponding to an $i^{th}$ element $x_3$ in the input sequence.

S212. Fuse value vectors in the value vector sequence according to the attention weight distribution, to obtain a network representation sequence corresponding to the input sequence. In one implementation, the attention weight distribution may refer to the local strength attention weight distribution.

The network representation sequence is a sequence formed by a plurality of network representations (vector representations). In this embodiment, the input sequence may be inputted to the neural network model, and the network representation sequence corresponding to the input sequence may be outputted through linear transformation or nonlinear transformation of model parameters in a hidden layer of the neural network model.

When a network representation corresponding to the current element $x_i$ is outputted, the computer device obtains an attention weight distribution $\alpha_i$ corresponding to the element from a local strength attention weight distribution matrix, uses each element in the attention weight distribution $\alpha_i$ corresponding to the element as a weight coefficient, and performs a weighted sum on the value vectors in the value vector sequence, to obtain a network representation $o_i$ corresponding to the current element $x_i$. In this case, a network representation sequence O corresponding to the input sequence is formed by a plurality of network representations, for example, $O=\{o_1, o_2, o_3, \ldots, o_I\}$.

An $i^{th}$ element $o_i$ in the network representation sequence O corresponding to the input sequence may be calculated by using the following formula:

$$o_i = \sum_{j=1}^{I} \alpha_{ij} v_j.$$

Because $\alpha_{ij}$ is a constant, and $v_j$ is a d-dimensional column vector, $o_i$ is also a d-dimensional column vector. That is, when the attention weight distribution corresponding to the $i^{th}$ element $x_i$ in the input sequence is $\alpha_i=\{\alpha_{i1}, \alpha_{i2}, \alpha_{i3}, \ldots, \alpha_{iI}\}$, and a value vector sequence corresponding to the input sequence is $V=\{v_1, v_2, v_3, \ldots, v_I\}$, a network representation $o_i$ corresponding to $x_i$ may be calculated by using the following formula:

$$o_i=\alpha_{i1}v_1+\alpha_{i2}v_2+\alpha_{i3}v_3+ \ldots +\alpha_{iI}v_I.$$

Because the attention weight distribution corresponding to the current element is a local strength attention weight distribution obtained after correction is performed based on an original logical similarity, the value vectors corresponding to all the elements in the input sequence are not fully considered during the weighted sum, but the value vectors corresponding to the elements falling within the locally strengthened range are emphatically considered. In this way, the outputted network representation of the current element includes local information associated with the current element.

The term "element" used in this application may be used for describing a basic composition unit of a vector (including a column vector or a matrix vector) in this specification. For example, "the elements in the input sequence" refer to inputs in the input sequence, and "the elements in the matrix" refer to column vectors that constitute the matrix, and "the elements in the column vector" refer to values in the column vector. That is, the term "element" refers to a basic composition unit that constitutes a sequence, a vector, or a matrix.

Figure 3:
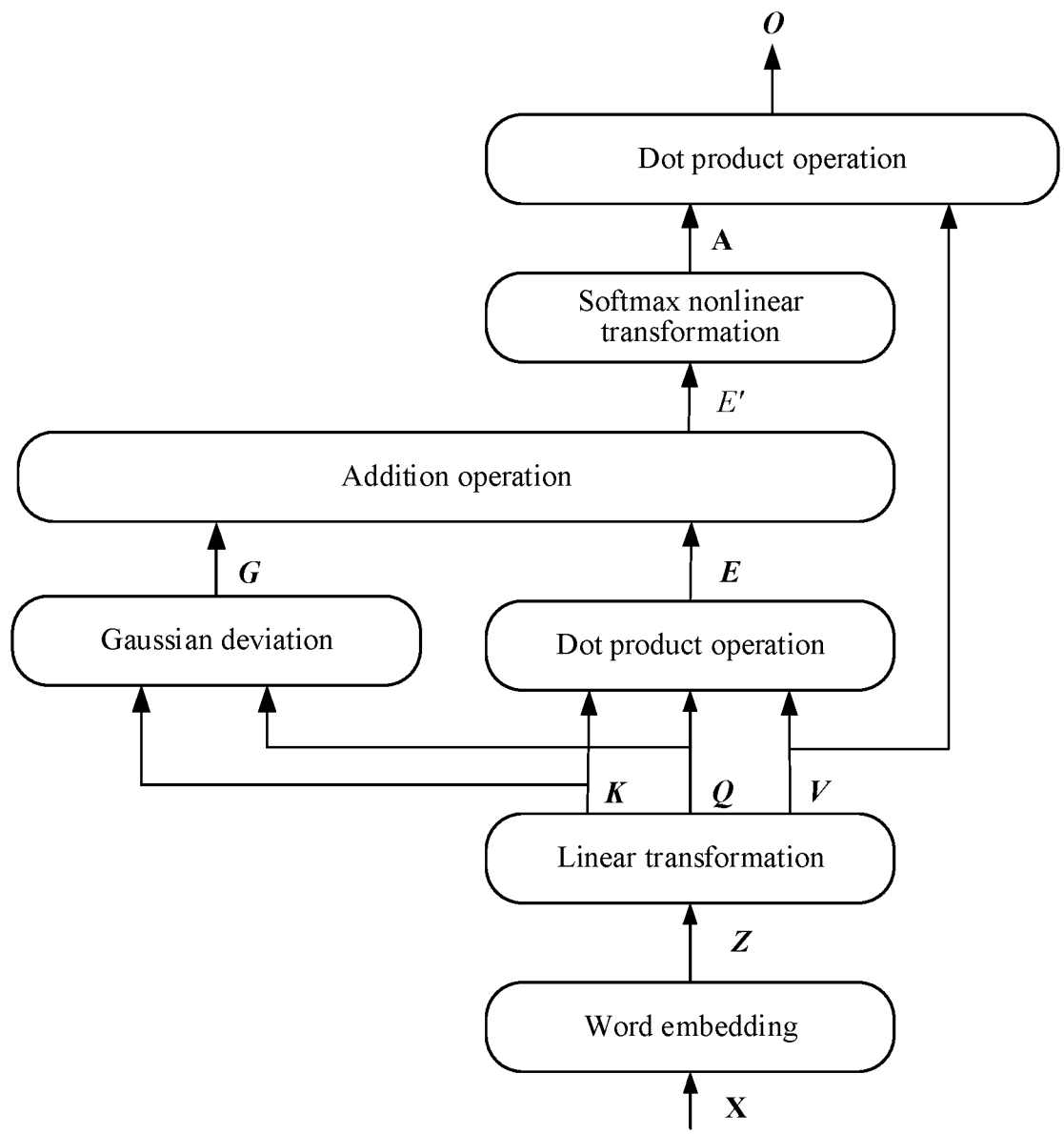
FIG. 3 is a schematic diagram of a process of calculating a network representation sequence corresponding to an input sequence in an embodiment.

FIG. 3 is a schematic diagram of a process of calculating a network representation sequence corresponding to an input sequence in an embodiment. Referring to FIG. 3, after a vectorized representation Z corresponding to an input sequence X is obtained, Z is linearly transformed into a request vector sequence Q, a key vector sequence K and a value vector sequence V through three different learnable parameter matrices, next, a logical similarity between each key value pair is calculated through a dot product operation, to obtain a logical similarity matrix E, then, a local strength matrix G is constructed according to Q or K, E is corrected by using G, to obtain a locally strengthened logical similarity matrix E', next, normalization is performed on E' by using the softmax function, to obtain a local strength attention weight distribution matrix A, and finally, a dot product operation is performed on A and the value vector sequence V, to output a network representation sequence O.

Figure 4:
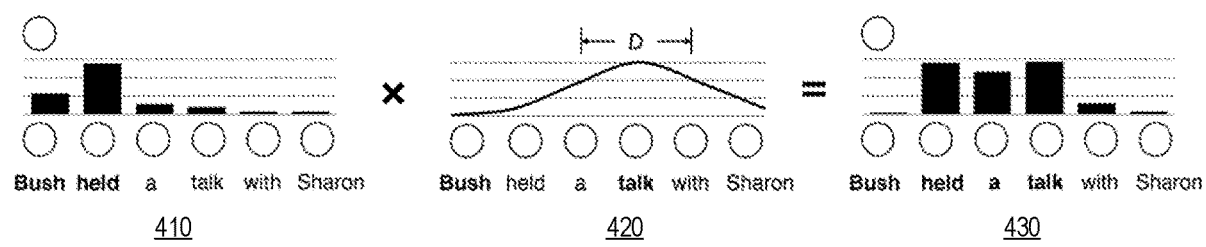
FIG. 4 is a system architecture diagram of correcting an SAN attention weight distribution by using a Gaussian distribution in an embodiment.

FIG. 4 is a system architecture diagram of correcting an SAN attention weight distribution by using a Gaussian distribution in an embodiment. For example, the input sequence is "Bush held a talk with Sharon", and the current element is "Bush". On 410 of FIG. 4, the original SAN is used for constructing a basic model, to obtain a logical similarity between each element pair (formed by two elements in the input sequence), an attention weight distribution corresponding to "Bush" is obtained through calculation based on the logical similarity considers all words. During assignment, the word "held" has the highest attention weight (a column height represents a magnitude of an attention weight), and remaining words have lower attention weights. Referring to 420 of FIG. 4, a position of a center point of a locally strengthened range corresponding to the current element "Bush" calculated by using the Gaussian distribution is approximately equal to 4, and corresponds to the word "talk" in the input sequence. A window size of the locally strengthened range is approximately equal to 3, that is, the locally strengthened range corresponding to the current element "Bush" is positions corresponding to three words centered on the word "talk". A local strength matrix is calculated based on the determined locally strengthened range, and the logical similarity obtained from 410 of FIG. 4 is corrected by using the local strength matrix, so that the corrected attention weights are centrally assigned between the three words, and the word "talk" has the highest attention weight during assignment. With reference to 410 of FIG. 4 and 420 of FIG. 4, a corrected attention weight distribution corresponding to the current element "Bush" on 430 of FIG. 4 is obtained. That is, the phrase "held a talk" obtains most attention weights. When the network representation corresponding to the word "Bush" is calculated, value vectors corresponding to the three words "held a talk" are considered emphatically. In this way, information of the phrase "held a talk" is captured and is associated with the word "Bush".

According to the network representation generating method for a neural network, the local strength matrix is constructed based on the request vector sequence corresponding to the input sequence, so that attention weights can be assigned in the locally strengthened range, to strengthen local information. After the linear transformation is performed on the source-side vector sequence corresponding to the input sequence, the request vector sequence, the key vector sequence, and the value vector sequence may be obtained, the logical similarity may be obtained according to the request vector sequence and the key vector sequence, and then the nonlinear transformation is performed based on the logical similarity and the local strength matrix, to obtain the local strength attention weight distribution, so as to correct original attention weights. Then, a weighted sum is performed on the value vector sequence according to the local strength attention weight distribution, so that a network representation sequence with the strengthened local information can be obtained. The obtained network representation sequence can not only strengthen local information, but also reserve a connection between long-distance elements in the input sequence.

Figure 5:
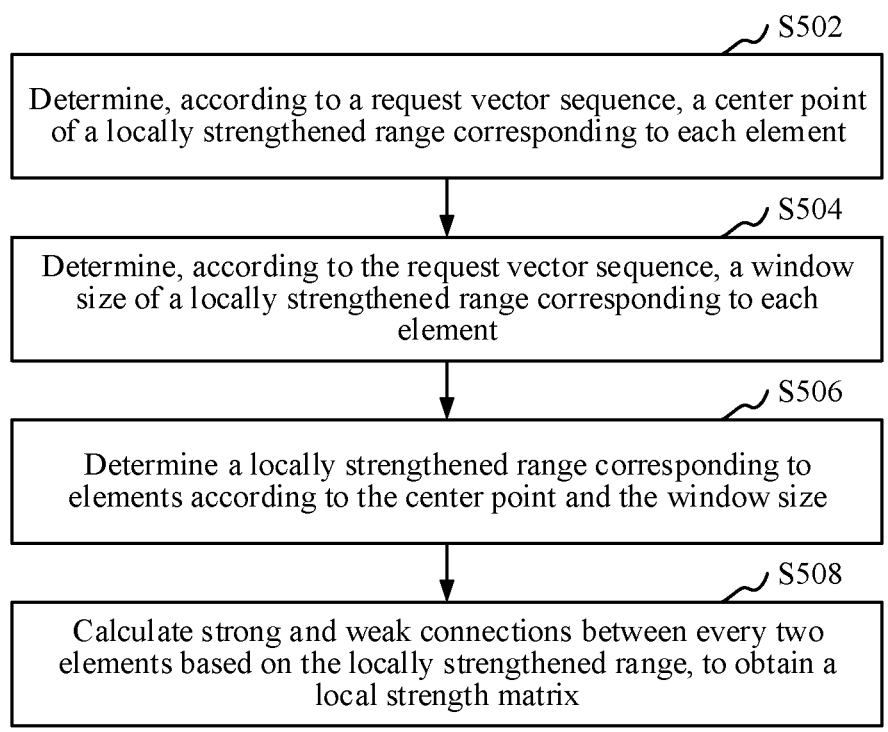
FIG. 5 is a schematic flowchart of constructing a local strength matrix according to a request vector sequence in an embodiment.

As shown in FIG. 5, in an embodiment, the constructing a local strength matrix according to the request vector sequence may include the following steps:

S502. Determine, according to the request vector sequence, a center point of a locally strengthened range corresponding to each element. In another implementation, S502 may include determining, according to the request vector sequence, a center point of a locally strengthened range corresponding to elements.

The locally strengthened range corresponding to each element in the input sequence is determined by the center point and the window size corresponding to each of the elements, and the center point corresponding to each of the elements depends on the request vector corresponding to each of the elements. Therefore, the center point of the locally strengthened range corresponding to each of the elements may be determined according to the request vector.

In an embodiment, the determining, according to the request vector sequence, a center point of a locally strengthened range corresponding to elements may include: performing, by using a first feedforward neural network for each element in the input sequence, transformation on a request vector corresponding to the element in the request vector sequence, to obtain a first scalar corresponding to the element; performing nonlinear transformation on the first scalar by using a nonlinear transformation function, to obtain a second scalar proportional to an input sequence length; and using the second scalar as the center point of the locally strengthened range corresponding to the element.

The computer device may determine, according to the request vector sequence obtained in step S204, the center point of the locally strengthened range corresponding to the elements. The $i^{th}$ element $x_i$ in the input sequence is used as an example, and a center point of a locally strengthened range corresponding to the $i^{th}$ element $x_i$ may be obtained by using the following steps:

1) The computer device maps, through the first feedforward neural network, a request vector $q_i$ corresponding to the $i^{th}$ element into a hidden state, and performs linear transformation on the request vector $q_i$ through $U_P^T$, to obtain a first scalar $p_i$ corresponding to the $i^{th}$ element in the input sequence. The first scalar $p_i$ is a value that belongs to a real number space, and a calculation formula of $p_i$ is as follows:

$$p_i = U_P^T \tan h(W_P q_i)$$

$\tan h(W_P q_i)$ is a part of the first feedforward neural network, tan h is an activation function, $q_i$ is a request vector corresponding to the $i^{th}$ element in the input sequence, both $U_P^T$ and $W_P$ are trainable linear transformation matrices, $U_P^T$ is a transposed matrix of $U_P$, $U_P$ p is a d-dimensional column vector, and $U_P^T$ is a d-dimensional row vector. In this way, a high-dimensional vector outputted by the feedforward neural network may be mapped to a scalar. This application herein and the following use the feedforward neural network to map the vectors to the hidden states, but do not limit a method for mapping the vectors through the feedforward neural network, and the feedforward neural network may be replaced with other neural network models, such as a long short-term memory (LSTM) model and variations thereof, a gated unit and variations thereof, or simple linear transformation.

2) The computer device transforms, through a nonlinear transformation function, the first scalar $p_i$ into a scalar whose value range is (0,1), and then, multiplies the scalar by an input sequence length I, to obtain a center point position $P_i$ whose value range is (0, I). $P_i$ is a center point of a locally strengthened range corresponding to the $i^{th}$ element, and $P_i$ is proportional to the input sequence length I. $P_i$ may be calculated by using the following formula:

$$P_i = I \cdot \text{sigmoid}(p_i)$$

sigmoid is a nonlinear transformation function, and may be used for transforming $p_i$ into a scalar whose value range is (0,1). A manner using sigmoid to transform the scalar herein and in the following may optionally be replaced with another method for mapping any real number to a value range (0,1). This is not limited in this application.

The computer device uses the calculated $P_i$ as the center point of the locally strengthened range corresponding to the $i^{th}$ element $x_i$ in the input sequence. For example, if the input sequence length I is 10, and the calculated $P_i$ is equal to 5, a center point of a locally strengthened range corresponding to $x_i$ is the fifth element in the input sequence. During generating of a network representation corresponding to $x_i$, the highest attention weight is assigned to a value vector of the fifth element in the input sequence.

The computer device may repeat the foregoing steps until the center point of the locally strengthened range corresponding to the each element is obtained according to each request vector in the request vector sequence.

S504. Determine, according to the request vector sequence, a window size of a locally strengthened range corresponding to each element. In another implementation, S504 may include determining, according to the request vector sequence, a window size of a locally strengthened range corresponding to elements.

To flexibly predict the window size, a corresponding window size may be predicted for each element. In this way, the computer device may determine, according to the request vectors in the request vector sequence, the window size of the locally strengthened range corresponding to the elements. That is, each request vector corresponds to a window size.

In an embodiment, the determining, according to the request vector sequence, a window size of a locally strengthened range corresponding to elements may include: performing, by using a second feedforward neural network for each element in the input sequence, linear transformation on a request vector corresponding to the element in the request vector sequence, to obtain a third scalar corresponding to the element; performing nonlinear transformation on the third scalar by using a nonlinear transformation function, to obtain a fourth scalar proportional to an input sequence length; and using the fourth scalar as the window size of the locally strengthened range corresponding to the element.

The computer device may determine, according to the request vector sequence obtained in step S204, the window size of the locally strengthened range corresponding to the elements. The $i^{th}$ element $x_i$ in the input sequence is used as an example, and a window size of a locally strengthened range corresponding to the $i^{th}$ element $x_i$ may be obtained by using the following steps:

1) The computer device maps, through a second feedforward neural network, a request vector $q_i$ corresponding to the $i^{th}$ element into a hidden state, and performs linear transformation on the request vector $q_i$, through $U_D^T$, to obtain a third scalar $z_i$ corresponding to the $i^{th}$ element in the input sequence. The third scalar $z_i$ is a value that belongs to a real number space, and a calculation formula of $z_i$ is as follows:

$$z_i = U_D^T \tan h(W_P q_i)$$

$\tan h(W_P q_i)$ is a part of the second feedforward neural network, tan h is an activation function, $q_i$ is a request vector corresponding to the $i^{th}$ element in the input sequence, $W_P$ is the same parameter matrix used previously for calculating the hidden state of the center point, $U_D^T$ is a trainable linear transformation matrix, $U_D^T$ is a transposed matrix of $U_D$, $U_D$ is a d-dimensional column vector, and $U_D^T$ is a d-dimensional row vector. In this way, a high-dimensional vector outputted by the feedforward neural network may be mapped to a scalar.

2) The computer device transforms, through a nonlinear transformation function, the third scalar $z_i$ into a scalar whose value range is (0,1), and then, multiplies the scalar by an input sequence length I, to obtain a window size $D_i$ whose value range is (0, I). $D_i$ is a window size of a locally strengthened range corresponding to the $i^{th}$ element, and $D_i$ is proportional to the input sequence length I. $D_i$ may be calculated by using the following formula:

$$D_i = I \cdot \text{sigmoid}(z_i).$$

sigmoid is a nonlinear transformation function, and is used for transforming $z_i$ into a scalar whose value range is (0,1).

The computer device uses the calculated $Z_i$ as the window size of the locally strengthened range corresponding to the $i^{th}$ element $x_i$ in the input sequence. For example, if the input sequence length I is 10, and a calculated length $Z_i$ is equal to 7, a window size of a locally strengthened range corresponding to $x_i$ is seven elements centered on a center point. During generating of a network representation corresponding to $x_i$, attention weights are centrally assigned to the seven elements.

The computer device may repeat the foregoing steps until the window size of the locally strengthened range corresponding to the each element is obtained according to each request vector in the request vector sequence.

S506. Determine a locally strengthened range corresponding to elements according to the center point and the window size.

It can be learned from the step S502 and step S504 that, because the request vectors corresponding to the elements in the input sequence are different, the center points and the window sizes corresponding to the elements are different. In this case, the locally strengthened ranges corresponding to the elements are also different. The locally strengthened range is selected according to characteristics of each element itself, which is more flexible.

S508. Calculate strong and weak connections between every two elements based on the locally strengthened range, to obtain a local strength matrix.

The computer device may calculate the strong and weak connections between every two elements based on the determined locally strengthened range, to obtain the local strength matrix. The strong and weak connections between every two elements are obtained by using the following formula:

$$G_{ij} = -\frac{2(j-P_i)^2}{D_i^2}.$$

$G_{ij}$ is a value of the $j^{th}$ element of the $i^{th}$ column vector in the local strength matrix G.

Figure 6:
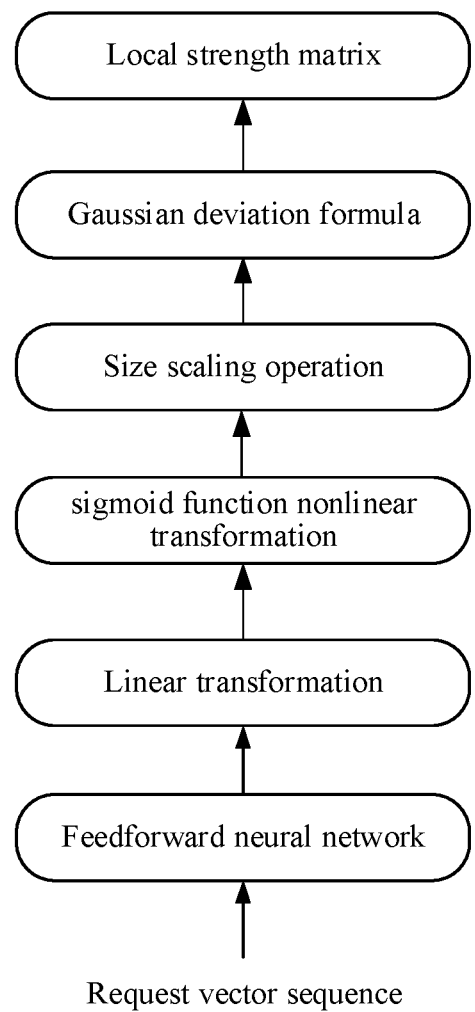
FIG. 6 is a schematic flowchart of determining a locally strengthened range according to a request vector sequence in an embodiment.

FIG. 6 is a schematic flowchart of determining a locally strengthened range according to a request vector sequence in an embodiment. Referring to FIG. 6, the request vector sequence is first mapped to the hidden state by using the feedforward neural network, the hidden state is then mapped to a scalar in the real number space by using the linear transformation, the scalar is transformed into a scalar whose value range is (0, 1) by using the nonlinear transformation function sigmoid, and the scalar is then multiplied by the input sequence length I, to obtain a center point and a window size, so that a locally strengthened range is determined, and a local strength matrix is obtained through calculation based on the locally strengthened range.

In the foregoing embodiments, by transforming the request vectors corresponding to the elements in the input sequence, the corresponding locally strengthened ranges are flexibly determined for the elements, instead of fixing a locally strengthened range for the input sequence, so that the dependence between the long-distance elements in the input sequence can be effectively improved.

In an embodiment, the constructing a local strength matrix according to the request vector sequence may include: determining, according to the request vector sequence, a center point of a locally strengthened range corresponding to elements; determining a uniform window size of a locally strengthened range according to the key vector sequence; determining a locally strengthened range corresponding to elements according to the center point and the window size; and calculating strong and weak connections between every two elements based on the locally strengthened range, to obtain the local strength matrix.

In this embodiment, the determining, according to the request vector sequence, a locally strengthened range corresponding to the elements is in the same way as the foregoing. Details are not described herein again. For the window size, global context information is considered. The window size of the locally strengthened range corresponding to all the elements in the input sequence is determined by a uniform window size, and in this case, when the window size is determined, the information of all the elements in the input sequence needs to be fused.

In an embodiment, the determining a uniform window size of a locally strengthened range according to the key vector sequence may include: obtaining key vectors in the key vector sequence; calculating an average value of the key vectors; performing linear transformation on the average value to obtain a fifth scalar; performing nonlinear transformation on the fifth scalar by using a nonlinear transformation function, to obtain a sixth scalar proportional to an input sequence length; and using the sixth scalar as the uniform window size of the locally strengthened range.

The computer device may determine the uniform window size of the locally strengthened range according to the key vector sequence obtained in the step S204, that is, the window size of the locally strengthened range corresponding to each element is the same. The uniform window size may be obtained by using the following steps:

1) The computer device obtains a key vector sequence K corresponding to the input sequence, and calculating an average value $\overline{K}$ of all key vectors in the key vector sequence K, where $$\overline{K} = \frac{\sum_{i=1}^{I} k_i}{I}.$$

2) The computer device performs linear transformation on the obtained average value $\overline{K}$, to generate a fifth scalar z in a real number space, where $$z = U_D^T \tanh(W_D \overline{K}).$$

$U_D^T$ is the same parameter matrix used previously for calculating the hidden state of the window size, and $W_D$ is a trainable linear transformation matrix.

3) The computer device transforms, through a nonlinear transformation function, the fifth scalar z into a scalar whose value range is (0,1), and then, multiplies the scalar by the input sequence length I, to obtain a window size D whose value range is (0, 1). D is a uniform window size of a locally strengthened range, and D is proportional to the input sequence length I. D may be calculated by using the following formula:

$$D = I \cdot \text{sigmoid}(z).$$

sigmoid is a nonlinear transformation function, and is used for transforming z into a scalar whose value range is (0,1).

Although the window size of the locally strengthened range corresponding to the each element is the same, because a center point corresponding to the each element is calculated according to the corresponding request vector, the each element corresponds to a different locally strengthened range. The computer device may calculate the strong and weak connections between every two elements based on the determined locally strengthened range, to obtain the local strength matrix. The strong and weak connections between every two elements are obtained by using the following formula:

$$G_{ij} = -\frac{2(j - P_i)^2}{D^2}.$$

$G_{ij}$ is a value of the $j^{th}$ element of the $i^{th}$ column vector in the local strength matrix G.

Figure 7:
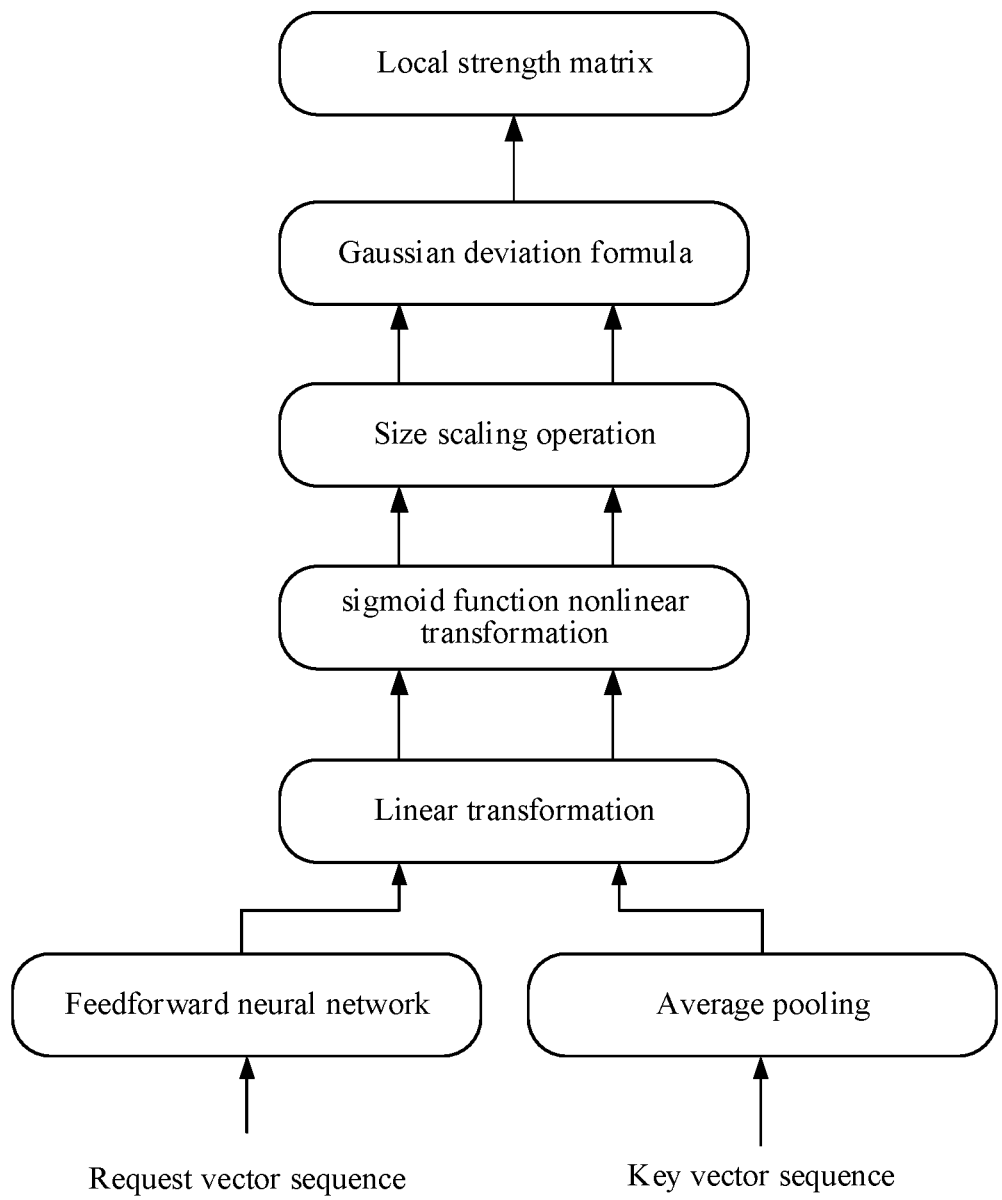
FIG. 7 is a schematic flowchart of determining a locally strengthened range according to a request vector sequence and a key vector sequence in an embodiment.

FIG. 7 is a schematic flowchart of determining a locally strengthened range according to a request vector sequence and a key vector sequence in an embodiment. Referring to FIG. 7, the request vector sequence is mapped to the hidden state by using the feedforward neural network, an average value on the key vector sequence is obtained through average pooling, the hidden state is then mapped to a scalar in a real number space by using the linear transformation, the average value is mapped to a scalar in the real number space, the obtained scalar is then transformed into a scalar whose value range is (0, 1) by using the nonlinear transformation function sigmoid, and the scalar is multiplied by the input sequence length I, to obtain a center point and a window size, so as to determine a locally strengthened range.

In the foregoing embodiments, by transforming the key vector sequence corresponding to the input sequence, the key vector sequence includes feature vectors (key vectors) corresponding to all the elements in the input sequence, and therefore, the determined uniform window size considers all the context information, so that the locally strengthened range corresponding to each element determined based on the uniform window size can capture abundant context information.

In an embodiment, the performing linear transformation on the source-side vector sequence, to separately obtain a request vector sequence, a key vector sequence and a value vector sequence corresponding to the source-side vector sequence may include: dividing the source-side vector sequence into a plurality of sets of low-dimensional source-side vector subsequences; and performing different linear transformations on each set of source-side vector subsequences according to a plurality of sets of different parameter matrices, to obtain a request vector sequence, a key vector sequence and a value vector sequence corresponding to the each set of source-side vector subsequences. The method further includes: performing linear transformation after splicing network representation subsequences corresponding to the each set of source-side vector subsequences, to obtain an outputted network representation sequence.

A stacked multi-head neural network may be used for processing the source-side vector sequence corresponding to the input sequence. In this case, the source-side vector sequence may be divided, to obtain a plurality of sets of (also called multi-head) low-dimensional source-side vector subsequences. For example, the source-side vector sequence includes five elements, each element is a 512-dimensional column vector, and the source-side vector sequence is divided into eight parts. That is, eight 5×64 source-side vector subsequences are obtained. The eight source-side vector subsequences are used as input vectors respectively, transformation is performed through different subspaces, to output eight 5×64 network representation subsequences, and linear transformation is performed after the eight network representation subsequences are spliced, to output a 5×512-dimensional network representation sequence.

For example, the stacked multi-head neural network includes H sets of subspaces. First, an input sequence $X = \{x_1, x_2, x_3, \ldots, x_I\}$ is transformed into a source-side vector sequence $Z = \{z_1, z_2, z_3, \ldots, z_I\}$. H source-side vector subsequences are obtained after $Z = \{z_1, z_2, z_3, \ldots, z_I\}$ is divided. Then, the source-side vector subsequences are separately transformed in the subspaces. For example, the transformation is performed in an $h^{th}$ (h=1, 2, . . . , H) subspace. In the $h^{th}$ subspace, linear transformation is performed on $Z_h = \{z_{h1}, z_{h2}, z_{h3}, \ldots m\, z_{hI}\}$ through corresponding learnable parameter matrices $W_h^Q$, $W_h^K$, and $W_h^V$, to obtain a corresponding request vector sequence $Q_h$, a key vector sequence $K_h$, and a value vector sequence $V_h$. In the H subspaces, all three learnable parameter matrices used in the subspaces are different, so that the subspaces separately obtains different feature vectors, and further different subspaces can pay attention to different local information.

Next, in the $h^{th}$ subspace, a logical similarity $E_h$ between the request vector sequence and the key vector sequence is calculated, and $$E_h = \frac{Q_h \cdot K_h^T}{\sqrt{d}}.$$

Then, a local strength matrix $G_h$ corresponding to the $h^{th}$ subspace is constructed according to the request vector sequence $Q_h$ or the key vector sequence $K_h$. In the local strength matrix $G_h$, a calculation formula of each element $G_{hi, hj}$ is that:

$$G_{hi,j} = -\frac{2(j - P_{hi})^2}{D_{hi}^2}.$$

The calculation formula is used for determining, according to $Q_h$, a center point $P_{hi}$ of the locally strengthened range corresponding to the $i^{th}$ element, and determining, according to $Q_h$ or $K_h$, a window size $D_{hi}$ of the locally strengthened range corresponding to the $i^{th}$ element. $G_{hi, hj}$ is a value of the $j^{th}$ element of the $i^{th}$ column vector in the local strength matrix $G_h$, and $G_{hi, hj}$ represents a strong and weak connection between the $j^{th}$ element and the center point $P_{hi}$ corresponding to the $i^{th}$ element in the input sequence expressed in the $h^{th}$ subspace.

Then, in the $h^{th}$ subspace, softmax nonlinear transformation is applied to transform the logical similarity into an attention weight distribution, the logical similarity is corrected through the local strength matrix $G_h$, to obtain the attention weight distribution $A_h$=soft max $(E_h+G_h)$, and in the $h^{th}$ subspace, an output representation sequence $O_h$ corresponding to the input sequence is continuously obtained through calculation of O=Concat($O_1$, $O_2$, $O_3$, . . . , $O_H$)$W^O$. Finally, the output representation sequences $O_h$ in the subspaces are spliced, and linear transformation is reperformed, to obtain a final output vector O=Concat($O_1$, $O_2$, $O_3$, . . . , $O_h$, . . . , $O_H$)$W^O$.

In an embodiment, the method further includes: using, after the network representation sequence corresponding to the input sequence is obtained, the network representation sequence as a new source-side vector sequence, and returning to the step of performing linear transformation on the source-side vector sequence, to separately obtain a request vector sequence, a key vector sequence and a value vector sequence corresponding to the source-side vector sequence to continuously perform the steps, to output a final network representation sequence until a cycle stop condition is met.

The neural network may stack multi-layer calculation, and whether the neural network is a one-layer neural network or a stacked multi-head neural network, the neural network may repeat the multi-layer calculation. During a calculation of each layer, an output of a previous layer is used as an input of a next layer, and the step of performing linear transformation, to separately obtain a corresponding request vector sequence, a key vector sequence and a value vector sequence is repeatedly performed, until an output of the current layer, that is, a network representation sequence of the current layer, is obtained. Considering efficiency and performance, a quantity of repetitions may be 6, and network parameters of the neural network at each layer are different. It may be understood that, a process of repeating 6 times is actually a process of updating a source-side vector sequence of an original input sequence 6 times through the network parameters of each layer.

For example, in the stacked multi-head neural network, an output of a first layer is $O^{L1}$. In a calculation of a second layer, $O^{L1}$ is used as an input, transformation is performed on $O^{L1}$ through network parameters of the second layer, to output outputs $O^{L2}$ . . . of the second layer, until the quantity of repetitions is reached, and an output whose repetition is 6 times is used as a final output, that is, $O^{L6}$ is used as the network representation sequence corresponding to the input sequence.

Figure 8:
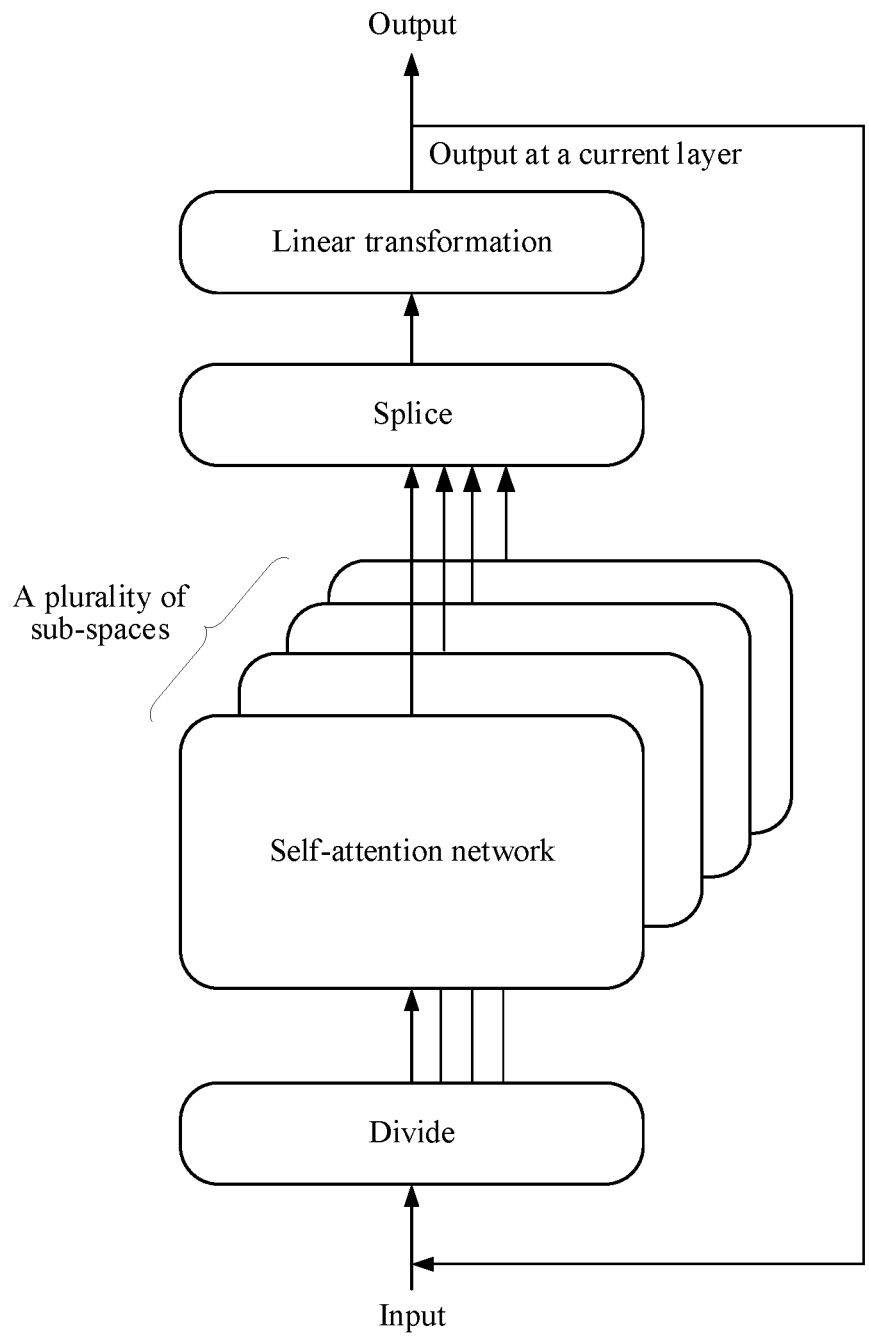
FIG. 8 is a schematic structural diagram of a multi-layer stacked multi-head self-attention neural network in an embodiment.

FIG. 8 is a schematic structural diagram of a multi-layer stacked multi-head self-attention neural network in an embodiment. Referring to FIG. 8, for each layer, inputs are the same, and each of the inputs is an output of the previous layer. Then, the input is divided into a plurality of sub-inputs, the same transformation is performed on the sub-inputs through respective network parameters of a plurality of sub-spaces (also called a plurality of heads), to obtain an output of each subspace, and finally, an output of a current layer is obtained after a plurality of outputs are spliced. The output of the current layer is an input of a next layer, and by repeating for a plurality of times, an output of a last layer is used as a final output.

In an embodiment, the input sequence may be a to-be-translated text sequence, and an outputted network representation sequence is feature vectors corresponding to words in a translated text. Therefore, a translated sentence may be determined according to the outputted network representation sequence. According to the embodiments of this application, significant improvements in translation quality for longer phrases and longer sentences are implemented.

Figure 9:
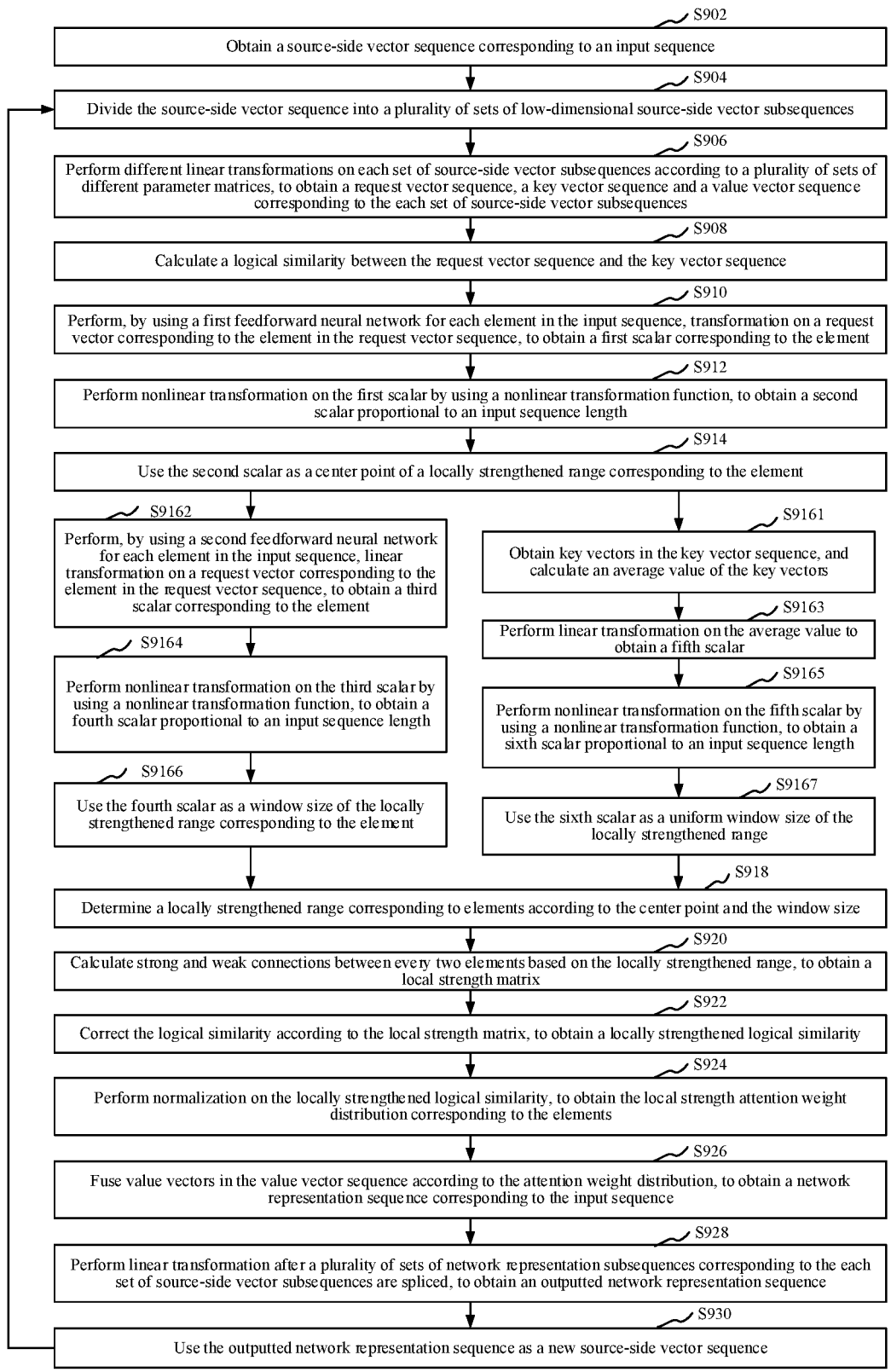
FIG. 9 is a schematic flowchart of a network representation generating method for a neural network in an embodiment.

FIG. 9 is a schematic flowchart of a network representation generating method for a neural network in an embodiment. The method includes the following steps:

S902. Obtain a source-side vector sequence corresponding to an input sequence.

S904. Divide the source-side vector sequence into a plurality sets of low-dimensional source-side vector subsequences.

S906. Perform different linear transformations on each set of source-side vector subsequences according to a plurality of sets of different parameter matrices, to obtain a request vector sequence, a key vector sequence and a value vector sequence corresponding to the each set of source-side vector subsequences.

S908. Calculate a logical similarity between the request vector sequence and the key vector sequence.

S910. Perform, by using a first feedforward neural network for each element in the input sequence, transformation on a request vector corresponding to the element in the request vector sequence, to obtain a first scalar corresponding to the element.

S912. Perform nonlinear transformation on the first scalar by using a nonlinear transformation function, to obtain a second scalar proportional to an input sequence length.

S914. Use the second scalar as a center point of a locally strengthened range corresponding to the element.

S9162. Perform, by using a second feedforward neural network for each element in the input sequence, linear transformation on a request vector corresponding to the element in the request vector sequence, to obtain a third scalar corresponding to the element.

S9164. Perform nonlinear transformation on the third scalar by using a nonlinear transformation function, to obtain a fourth scalar proportional to an input sequence length.

S9166. Use the fourth scalar as a window size of the locally strengthened range corresponding to the element.

S9161. Obtain key vectors in the key vector sequence, and calculate an average value of the key vectors.

S9163. Perform linear transformation on the average value to obtain a fifth scalar.

S9165. Perform nonlinear transformation on the fifth scalar by using a nonlinear transformation function, to obtain a sixth scalar proportional to an input sequence length.

S9167. Use the sixth scalar as a uniform window size of the locally strengthened range.

S918. Determine a locally strengthened range corresponding to elements according to the center point and the window size.

S920. Calculate strong and weak connections between every two elements based on the locally strengthened range, to obtain a local strength matrix.

S922. Correct the logical similarity according to the local strength matrix, to obtain a locally strengthened logical similarity.

S924. Perform normalization on the locally strengthened logical similarity, to obtain a local strength attention weight distribution corresponding to the elements.

S926. Fuse value vectors in the value vector sequence according to the attention weight distribution, to obtain a network representation sequence corresponding to the input sequence.

S928. Perform linear transformation after a plurality of sets of network representation subsequences corresponding to the each set of source-side vector subsequences are spliced, to obtain an outputted network representation sequence.

S930. Use the outputted network representation sequence as a new source-side vector sequence, and return to step S904 until a final network representation sequence is obtained.

According to the network representation generating method for a neural network, the local strength matrix is constructed based on the request vector sequence corresponding to the input sequence, so that attention weights can be assigned in the locally strengthened range, to strengthen local information. After the linear transformation is performed on the source-side vector sequence corresponding to the input sequence, the request vector sequence, the key vector sequence, and the value vector sequence may be obtained, the logical similarity may be obtained according to the request vector sequence and the key vector sequence, and then the nonlinear transformation is performed based on the logical similarity and the local strength matrix, to obtain the local strength attention weight distribution, so as to correct original attention weights. Then, a weighted sum is performed on the value vector sequence according to the local strength attention weight distribution, so that a network representation sequence with the strengthened local information can be obtained. The obtained network representation sequence can not only strengthen local information, but also reserve a connection between long-distance elements in the input sequence.

Steps in the flowchart in FIG. 9 are displayed sequentially based on indication of arrows, but the steps are not necessarily performed sequentially based on the sequence indicated by the arrows. Unless explicitly specified in this application, the steps are performed without any strict sequence limitation, and may be performed in another sequence. In addition, at least some of the steps in FIG. 9 may include a plurality of substeps or a plurality of stages. The substeps or the stages are not necessarily performed at the same moment, but may be performed at different moments. The substeps or stages are not necessarily performed sequentially, but may be performed in turn or alternately with another step or at least some of substeps or stages of the another step.

Figure 10:
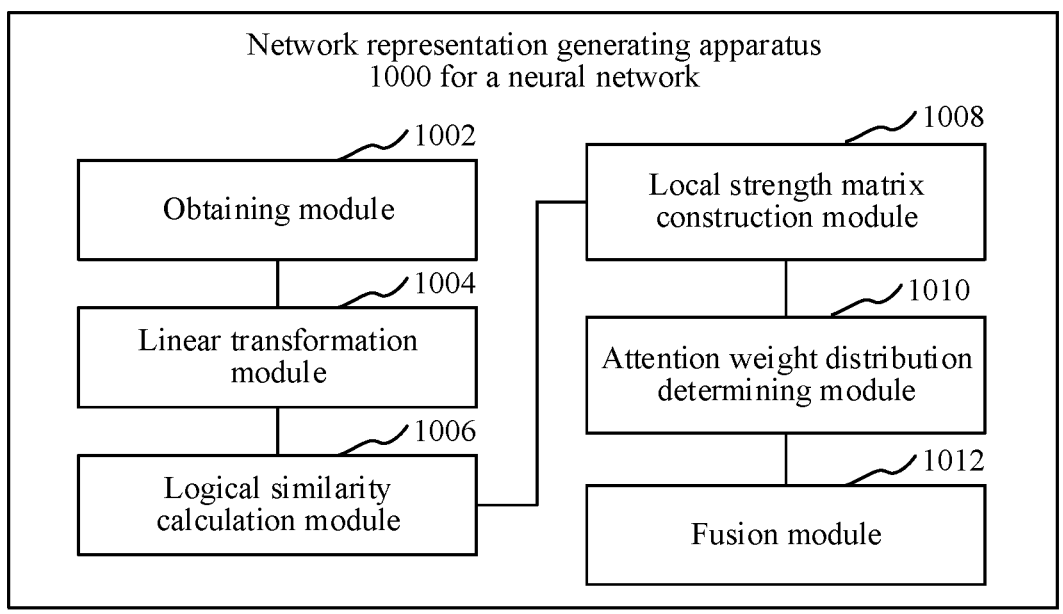
FIG. 10 is a structural block diagram of a network representation generating apparatus for a neural network in an embodiment.

In an embodiment, as shown in FIG. 10, a network representation generating apparatus 1000 for a neural network is provided. The apparatus includes an obtaining module 1002, a linear transformation module 1004, a logical similarity calculation module 1006, a local strength matrix construction module 1008, an attention weight distribution determining module 1010, and a fusion module 1012.

The obtaining module 1002 is configured to obtain a source-side vector sequence corresponding to an input sequence.

The linear transformation module 1004 is configured to perform linear transformation on the source-side vector sequence, to separately obtain a request vector sequence, a key vector sequence and a value vector sequence corresponding to the source-side vector sequence.

The logical similarity calculation module 1006 is configured to calculate a logical similarity between the request vector sequence and the key vector sequence.

The local strength matrix construction module 1008 is configured to construct a local strength matrix according to the request vector sequence.

The attention weight distribution determining module 1010 is configured to perform nonlinear transformation based on the logical similarity and the local strength matrix, to obtain a local strength attention weight distribution corresponding to the elements.

The fusion module 1012 is configured to fuse value vectors in the value vector sequence according to the attention weight distribution, to obtain a network representation sequence corresponding to the input sequence.

In an embodiment, the local strength matrix construction module 1008 is further configured to: determine, according to the request vector sequence, a center point of a locally strengthened range corresponding to elements; determine, according to the request vector sequence, a window size of a locally strengthened range corresponding to elements; determine a locally strengthened range corresponding to elements according to the center point and the window size; and calculate strong and weak connections between every two elements based on the locally strengthened range, to obtain the local strength matrix.

In an embodiment, the local strength matrix construction module 1008 is further configured to: determine, according to the request vector sequence, a center point of a locally strengthened range corresponding to elements; determine a uniform window size of a locally strengthened range according to the key vector sequence; determine a locally strengthened range corresponding to elements according to the center point and the window size; and calculate strong and weak connections between every two elements based on the locally strengthened range, to obtain the local strength matrix.

In an embodiment, the local strength matrix construction module 1008 is further configured to: perform, by using a first feedforward neural network for each element in the input sequence, transformation on a request vector corresponding to the element in the request vector sequence, to obtain a first scalar corresponding to the element; perform nonlinear transformation on the first scalar by using a nonlinear transformation function, to obtain a second scalar proportional to an input sequence length; and use the second scalar as the center point of the locally strengthened range corresponding to the element.

In an embodiment, the local strength matrix construction module 1008 is further configured to: perform, by using a second feedforward neural network for each element in the input sequence, linear transformation on a request vector corresponding to the element in the request vector sequence, to obtain a third scalar corresponding to the element; perform nonlinear transformation on the third scalar by using a nonlinear transformation function, to obtain a fourth scalar proportional to an input sequence length; and use the fourth scalar as the window size of the locally strengthened range corresponding to the element.

In an embodiment, the local strength matrix construction module 1008 is further configured to: obtain key vectors in the key vector sequence; calculate an average value of the key vectors; perform linear transformation on the average value to obtain a fifth scalar; perform nonlinear transformation on the fifth scalar by using a nonlinear transformation function, to obtain a sixth scalar proportional to an input sequence length; and use the sixth scalar as the uniform window size of the locally strengthened range.

In an embodiment, the local strength matrix construction module 1008 is further configured to: use the center point as an expectation of a Gaussian distribution, and use the window size as a variance of the Gaussian distribution; determine a locally strengthened range according to the Gaussian distribution determined according to the average value (or expectation of a Gaussian distribution) and the variance; and sequentially arrange the strong and weak connections between every two elements according to a sequence of the elements in the input sequence, to obtain the local strength matrix. The strong and weak connections between every two elements are obtained by using the following formula:

$$G_{ij} = -\frac{2(j - P_i)^2}{D_i^2}.$$

$G_{ij}$ represents a strong and weak connection between a $j^{th}$ element in the input sequence and a center point $P_i$ corresponding to an $i^{th}$ element, and is a value of a $j^{th}$ element of an $i^{th}$ column vector in a local strength matrix G; $P_i$ represents a center point of a locally strengthened range corresponding to the $i^{th}$ element; and $D_i$ represents a window size of the locally strengthened range corresponding to the $i^{th}$ element.

In an embodiment, the attention weight distribution determining module 1010 is further configured to: correct the logical similarity according to the local strength matrix, to obtain a locally strengthened logical similarity; and perform normalization on the locally strengthened logical similarity, to obtain the local strength attention weight distribution corresponding to the elements.

In an embodiment, the linear transformation module 1004 is further configured to: divide the source-side vector sequence into a plurality of sets of low-dimensional source-side vector subsequences; and perform different linear transformations on each set of source-side vector subsequences according to a plurality of sets of different parameter matrices, to obtain a request vector sequence, a key vector sequence and a value vector sequence corresponding to the each set of source-side vector subsequences. The apparatus further includes a splicing module, configured to: perform linear transformation after splicing network representation subsequences corresponding to the each set of source-side vector subsequences, to obtain an outputted network representation sequence.

In an embodiment, the apparatus 1000 further includes: a cycle module, configured to: use, after the network representation sequence corresponding to the input sequence is obtained, the network representation sequence as a new source-side vector sequence, and return to the step of performing linear transformation on the source-side vector sequence, to separately obtain a request vector sequence, a key vector sequence and a value vector sequence corresponding to the source-side vector sequence to continuously perform the operations, to output a final network representation sequence until a cycle stop condition is met.

According to the network representation generating apparatus 1000 for a neural network, the local strength matrix is constructed based on the request vector sequence corresponding to the input sequence, so that attention weights can be assigned in the locally strengthened range, to strengthen local information. After the linear transformation is performed on the source-side vector sequence corresponding to the input sequence, the request vector sequence, the key vector sequence, and the value vector sequence may be obtained, the logical similarity may be obtained according to the request vector sequence and the key vector sequence, and then the nonlinear transformation is performed based on the logical similarity and the local strength matrix, to obtain the local strength attention weight distribution, so as to correct original attention weights. Then, a weighted sum is performed on the value vector sequence according to the local strength attention weight distribution, so that a network representation sequence with the strengthened local information can be obtained. The obtained network representation sequence can not only strengthen local information, but also reserve a connection between long-distance elements in the input sequence.

Figure 11:
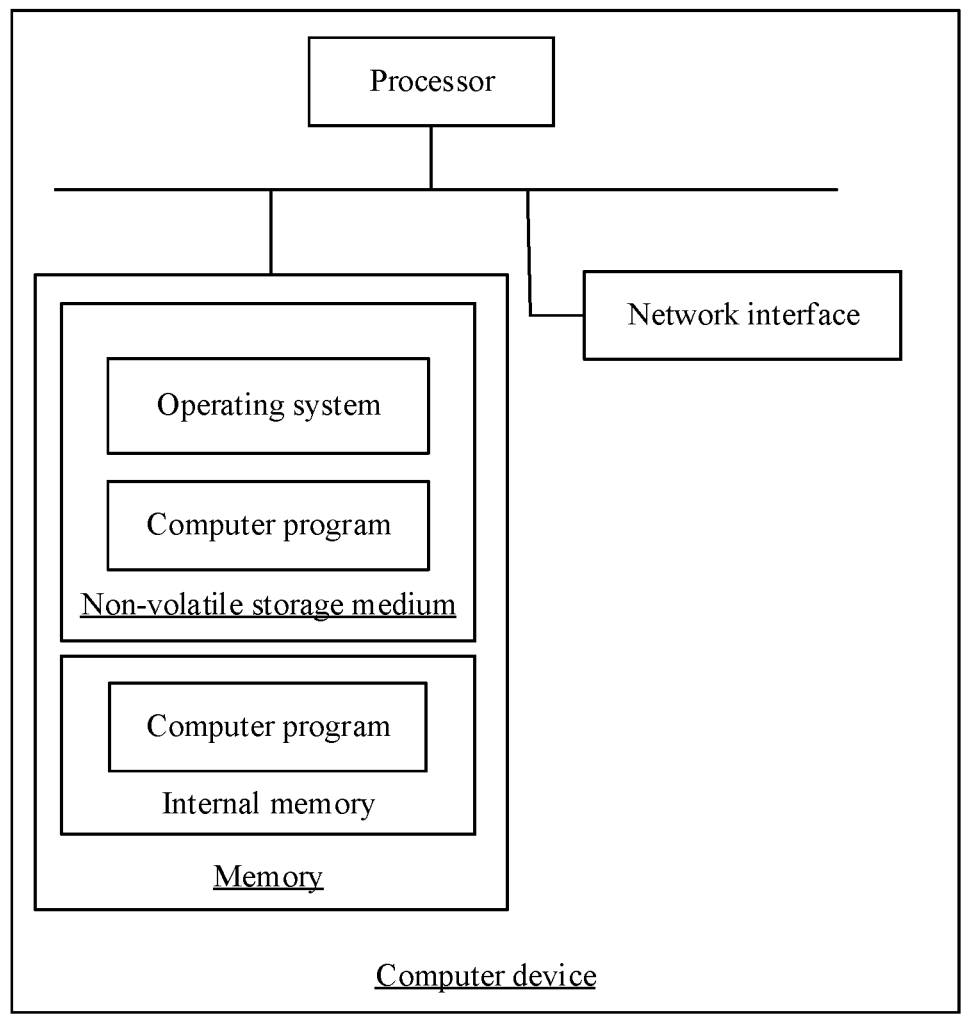
FIG. 11 is a structural block diagram of a computer device in an embodiment.

FIG. 11 is a diagram of an internal structure of a computer device 120 in an embodiment. As shown in FIG. 11, the computer device includes a processor, a memory, and a network interface connected by using a system bus. The memory includes a non-volatile storage medium and an internal memory. The non-volatile storage medium of the computer device stores an operating system, and may further store a computer program. The computer program, when executed by the processor, may cause the processor to implement the network representation generating method for a neural network. The internal memory may also store a computer program. The computer program, when executed by the processor, may cause the processor to perform the network representation generating method for a neural network.

A person skilled in the art may understand that, the structure shown in FIG. 11 is merely a block diagram of a partial structure related to the solution in this application, and does not constitute a limitation to the computer device to which the solution of this application is applied. Actually, the computer device may include more or fewer components than those shown in the figure, or some components may be combined, or a different component deployment may be used.

In an embodiment, the network representation generating apparatus 1000 for a neural network provided in this application may be implemented in a form of a computer program. The computer program may run on the computer device shown in FIG. 11. Program modules forming the network representation generating apparatus 1000 for a neural network, for example, the obtaining module 1002, the linear transformation module 1004, the logical similarity calculation module 1006, the local strength matrix construction module 1008, the attention weight distribution determining module 1010, and the fusion module 1012 in FIG. 10, may be stored in the memory of the computer device. The computer program formed by the program modules causes the processor to perform the steps in the network representation generating method for a neural network in the embodiments of this application described in this specification.

For example, the computer device shown in FIG. 11 may perform step S202 by using the obtaining module 1002 in the network representation generating apparatus for a neural network shown in FIG. 10. The computer device may perform step S204 by using the linear transformation module 1004. The computer device may perform step S206 by using the logical similarity calculation module 1006. The computer device may perform step S208 by using the local strength matrix construction module 1008. The computer device may perform step S210 by using the attention weight distribution determining module 1010. The computer device may perform step S212 by using the fusion module 1012.

In an embodiment, a computer device is provided, including a memory and a processor, the memory storing a computer program, the computer program, when executed by the processor, causing the processor to perform the following steps: obtaining a source-side vector sequence corresponding to an input sequence; performing linear transformation on the source-side vector sequence, to separately obtain a request vector sequence, a key vector sequence and a value vector sequence corresponding to the source-side vector sequence; calculating a logical similarity between the request vector sequence and the key vector sequence; constructing a local strength matrix according to the request vector sequence; performing nonlinear transformation based on the logical similarity and the local strength matrix, to obtain a local strength attention weight distribution corresponding to elements; and fusing value vectors in the value vector sequence according to the attention weight distribution, to obtain a network representation sequence corresponding to the input sequence.

In an embodiment, the computer program, when executed by the processor to perform the step of constructing a local strength matrix according to the request vector sequence, causes the processor to perform the following steps: determining, according to the request vector sequence, a center point of a locally strengthened range corresponding to elements; determining, according to the request vector sequence, a window size of a locally strengthened range corresponding to elements; determining a locally strengthened range corresponding to elements according to the center point and the window size; and calculating strong and weak connections between every two elements based on the locally strengthened range, to obtain the local strength matrix.

In an embodiment, the computer program, when executed by the processor to perform the step of constructing a local strength matrix according to the request vector sequence, causes the processor to perform the following steps: determining, according to the request vector sequence, a center point of a locally strengthened range corresponding to elements; determining a uniform window size of a locally strengthened range according to the key vector sequence; determining a locally strengthened range corresponding to elements according to the center point and the window size; and calculating strong and weak connections between every two elements based on the locally strengthened range, to obtain the local strength matrix.

In an embodiment, the computer program, when executed by the processor to perform the step of determining, according to the request vector sequence, a center point of a locally strengthened range corresponding to elements, causes the processor to perform the following steps: performing, by using a first feedforward neural network for each element in the input sequence, transformation on a request vector corresponding to the element in the request vector sequence, to obtain a first scalar corresponding to the element; performing nonlinear transformation on the first scalar by using a nonlinear transformation function, to obtain a second scalar proportional to an input sequence length; and using the second scalar as the center point of the locally strengthened range corresponding to the element.

In an embodiment, the computer program, when executed by the processor to perform the step of determining, according to the request vector sequence, a window size of a locally strengthened range corresponding to elements, causes the processor to perform the following steps: performing, by using a second feedforward neural network for each element in the input sequence, linear transformation on a request vector corresponding to the element in the request vector sequence, to obtain a third scalar corresponding to the element; performing nonlinear transformation on the third scalar by using a nonlinear transformation function, to obtain a fourth scalar proportional to an input sequence length; and using the fourth scalar as the window size of the locally strengthened range corresponding to the element.

In an embodiment, the computer program, when executed by the processor to perform the step of determining a uniform window size of a locally strengthened range according to the key vector sequence, causes the processor to perform the following steps: obtaining key vectors in the key vector sequence; calculating an average value of the key vectors; performing linear transformation on the average value to obtain a fifth scalar; performing nonlinear transformation on the fifth scalar by using a nonlinear transformation function, to obtain a sixth scalar proportional to an input sequence length; and using the sixth scalar as the uniform window size of the locally strengthened range.

In an embodiment, the computer program, when executed by the processor to perform the step of determine a locally strengthened range corresponding to elements according to the center point and the window size, causes the processor to perform the following steps: using the center point as an expectation of a Gaussian distribution, and using the window size as a variance of the Gaussian distribution; and determining a locally strengthened range according to the Gaussian distribution determined according to the average value and the variance. The computer program, when executed by the processor to perform the step of calculating strong and weak connections between every two elements based on the locally strengthened range, to obtain the locally strengthening matrix, causes the processor to perform the following steps: sequentially arranging the strong and weak connections between every two elements according to a sequence of the elements in the input sequence, to obtain the local strength matrix. The strong and weak connections between every two elements are obtained by using the following formula:

$$G_{ij} = -\frac{2(j - P_i)^2}{D_i^2},$$

$G_{ij}$ represents a strong and weak connection between a $j^{th}$ element in the input sequence and a center point $P_i$ corresponding to an $i^{th}$ element, and $G_{ij}$ is a value of a $j^{th}$ element of an $i^{th}$ column vector in a local strength matrix G; $P_i$ represents a center point of a locally strengthened range corresponding to the $i^{th}$ element; and $D_i$ represents a window size of the locally strengthened range corresponding to the $i^{th}$ element.

In an embodiment, the computer program, when executed by the processor to perform the step of performing nonlinear transformation based on the logical similarity and the local strength matrix, to obtain a local strength attention weight distribution corresponding to the elements, causes the processor to perform the following steps: correcting the logical similarity according to the local strength matrix, to obtain a locally strengthened logical similarity; and performing normalization on the locally strengthened logical similarity, to obtain the local strength attention weight distribution corresponding to the elements.

In an embodiment, the computer program, when executed by the processor to perform the step of performing linear transformation on the source-side vector sequence, to separately obtain a request vector sequence, a key vector sequence and a value vector sequence corresponding to the source-side vector sequence, causes the processor to perform the following steps: dividing the source-side vector sequence into a plurality of sets of low-dimensional source-side vector subsequences; and performing different linear transformations on each set of source-side vector subsequences according to a plurality of sets of different parameter matrices, to obtain a request vector sequence, a key vector sequence and a value vector sequence corresponding to the each set of source-side vector subsequences. The computer program, when executed by the processor, causes the processor to further perform the following steps: performing linear transformation after splicing network representation subsequences corresponding to each set of source-side vector subsequences, to obtain an outputted network representation sequence.

In an embodiment, the computer program, when executed by the processor, causes the processor to further perform the following steps: using, after the network representation sequence corresponding to the input sequence is obtained, the network representation sequence as a new source-side vector sequence, and returning to the step of performing linear transformation on the source-side vector sequence, to separately obtain a request vector sequence, a key vector sequence and a value vector sequence corresponding to the source-side vector sequence to continuously perform the steps, to output a final network representation sequence until a cycle stop condition is met.

According to the computer device, the local strength matrix is constructed based on the request vector sequence corresponding to the input sequence, so that attention weights can be assigned in the locally strengthened range, to strengthen local information. After the linear transformation is performed on the source-side vector sequence corresponding to the input sequence, the request vector sequence, the key vector sequence, and the value vector sequence may be obtained, the logical similarity may be obtained according to the request vector sequence and the key vector sequence, and then the nonlinear transformation is performed based on the logical similarity and the local strength matrix, to obtain the local strength attention weight distribution, so as to correct original attention weights. Then, a weighted sum is performed on the value vector sequence according to the local strength attention weight distribution, so that a network representation sequence with the strengthened local information can be obtained. The obtained network representation sequence can not only strengthen local information, but also reserve a connection between long-distance elements in the input sequence.

In an embodiment, a computer-readable storage medium is provided, the computer-readable storage medium storing a computer program, the computer program, when executed by a processor, causing the processor to perform the following steps: obtaining a source-side vector sequence corresponding to an input sequence; performing linear transformation on the source-side vector sequence, to separately obtain a request vector sequence, a key vector sequence and a value vector sequence corresponding to the source-side vector sequence; calculating a logical similarity between the request vector sequence and the key vector sequence; constructing a local strength matrix according to the request vector sequence; performing nonlinear transformation based on the logical similarity and the local strength matrix, to obtain a local strength attention weight distribution corresponding to elements; and fusing value vectors in the value vector sequence according to the attention weight distribution, to obtain a network representation sequence corresponding to the input sequence.

In an embodiment, the computer program, when executed by the processor to perform the step of constructing a local strength matrix according to the request vector sequence, causes the processor to perform the following steps: determining, according to the request vector sequence, a center point of a locally strengthened range corresponding to elements; determining, according to the request vector sequence, a window size of a locally strengthened range corresponding to elements; determining a locally strengthened range corresponding to elements according to the center point and the window size; and calculating strong and weak connections between every two elements based on the locally strengthened range, to obtain the local strength matrix.

In an embodiment, the computer program, when executed by the processor to perform the step of constructing a local strength matrix according to the request vector sequence, causes the processor to perform the following steps: determining, according to the request vector sequence, a center point of a locally strengthened range corresponding to elements; determining a uniform window size of a locally strengthened range according to the key vector sequence; determining a locally strengthened range corresponding to elements according to the center point and the window size; and calculating strong and weak connections between every two elements based on the locally strengthened range, to obtain the local strength matrix.

In an embodiment, the computer program, when executed by the processor to perform the step of determining, according to the request vector sequence, a center point of a locally strengthened range corresponding to elements, causes the processor to perform the following steps: performing, by using a first feedforward neural network for each element in the input sequence, transformation on a request vector corresponding to the element in the request vector sequence, to obtain a first scalar corresponding to the element; performing nonlinear transformation on the first scalar by using a nonlinear transformation function, to obtain a second scalar proportional to an input sequence length; and using the second scalar as the center point of the locally strengthened range corresponding to the element.

In an embodiment, the computer program, when executed by the processor to perform the step of determining, according to the request vector sequence, a window size of a locally strengthened range corresponding to elements, causes the processor to perform the following steps: performing, by using a second feedforward neural network for each element in the input sequence, linear transformation on a request vector corresponding to the element in the request vector sequence, to obtain a third scalar corresponding to the element; performing nonlinear transformation on the third scalar by using a nonlinear transformation function, to obtain a fourth scalar proportional to an input sequence length; and using the fourth scalar as the window size of the locally strengthened range corresponding to the element.

In an embodiment, the computer program, when executed by the processor to perform the step of determining a uniform window size of a locally strengthened range according to the key vector sequence, causes the processor to perform the following steps: obtaining key vectors in the key vector sequence; calculating an average value of the key vectors; performing linear transformation on the average value to obtain a fifth scalar; performing nonlinear transformation on the fifth scalar by using a nonlinear transformation function, to obtain a sixth scalar proportional to an input sequence length; and using the sixth scalar as the uniform window size of the locally strengthened range.

In an embodiment, the computer program, when executed by the processor to perform the step of determine a locally strengthened range corresponding to elements according to the center point and the window size, causes the processor to perform the following steps: using the center point as an expectation of a Gaussian distribution, and using the window size as a variance of the Gaussian distribution; and determining a locally strengthened range according to the Gaussian distribution determined according to the average value and the variance. The computer program, when executed by the processor to perform the step of calculating strong and weak connections between every two elements based on the locally strengthened range, to obtain the locally strengthening matrix, causes the processor to perform the following steps: sequentially arranging the strong and weak connections between every two elements according to a sequence of the elements in the input sequence, to obtain the local strength matrix. The strong and weak connections between every two elements are obtained by using the following formula:

$$G_{ij} = -\frac{2(j-P_i)^2}{D_i^2}.$$

$G_{ij}$ represents a strong and weak connection between a $j^{th}$ element in the input sequence and a center point $P_i$ corresponding to an $i^{th}$ element, and $G_{ij}$ is a value of a $j^{th}$ element of an $i^{th}$ column vector in a local strength matrix G; $P_i$ represents a center point of a locally strengthened range corresponding to the $i^{th}$ element; and $D_i$ represents a window size of the locally strengthened range corresponding to the $i^{th}$ element.

In an embodiment, the computer program, when executed by the processor to perform the step of performing nonlinear transformation based on the logical similarity and the local strength matrix, to obtain a local strength attention weight distribution corresponding to the elements, causes the processor to perform the following steps: correcting the logical similarity according to the local strength matrix, to obtain a locally strengthened logical similarity; and performing normalization on the locally strengthened logical similarity, to obtain the local strength attention weight distribution corresponding to the elements.

In an embodiment, the computer program, when executed by the processor to perform the step of performing linear transformation on the source-side vector sequence, to separately obtain a request vector sequence, a key vector sequence and a value vector sequence corresponding to the source-side vector sequence, causes the processor to perform the following steps: dividing the source-side vector sequence into a plurality of sets of low-dimensional source-side vector subsequences; and performing different linear transformations on each set of source-side vector subsequences according to a plurality of sets of different parameter matrices, to obtain a request vector sequence, a key vector sequence and a value vector sequence corresponding to the each set of source-side vector subsequences. The computer program, when executed by the processor, causes the processor to further perform the following steps: performing linear transformation after splicing network representation subsequences corresponding to each set of source-side vector subsequences, to obtain an outputted network representation sequence.

In an embodiment, the computer program, when executed by the processor, causes the processor to further perform the following steps: using, after the network representation sequence corresponding to the input sequence is obtained, the network representation sequence as a new source-side vector sequence, and returning to the step of performing linear transformation on the source-side vector sequence, to separately obtain a request vector sequence, a key vector sequence and a value vector sequence corresponding to the source-side vector sequence to continuously perform the steps, to output a final network representation sequence until a cycle stop condition is met.

According to the computer-readable storage medium, the local strength matrix is constructed based on the request vector sequence corresponding to the input sequence, so that attention weights can be assigned in the locally strengthened range, to strengthen local information. After the linear transformation is performed on the source-side vector sequence corresponding to the input sequence, the request vector sequence, the key vector sequence, and the value vector sequence may be obtained, the logical similarity may be obtained according to the request vector sequence and the key vector sequence, and then the nonlinear transformation is performed based on the logical similarity and the local strength matrix, to obtain the local strength attention weight distribution, so as to correct original attention weights. Then, a weighted sum is performed on the value vector sequence according to the local strength attention weight distribution, so that a network representation sequence with the strengthened local information can be obtained. The obtained network representation sequence can not only strengthen local information, but also reserve a connection between long-distance elements in the input sequence.

A person of ordinary skill in the art may understand that some or all procedures in the foregoing method embodiments may be implemented by a computer program instructing related hardware. The program may be stored in a non-volatile computer-readable storage medium, and when the program is executed, the procedures of the foregoing method embodiments may be performed. Any reference to a memory, a storage, a database, or another medium used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), a flash memory, or the like. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

The foregoing embodiments merely show several implementations of this application, and descriptions thereof are in detail, but cannot be understood as a limitation to the patent scope of this application. A person of ordinary skill in the art may further make variations and improvements without departing from the ideas of this application. The variations and improvements fall within the protection scope of this application. Therefore, the protection scope of the patent of this application shall be subject to the appended claims.

What is claimed is:

1. A method for generating a network representation for a neural network, the method comprising:
   obtaining, by a device comprising a memory storing instructions and a processor in communication with the memory, a source-side vector sequence corresponding to an input sequence;
   performing, by the device, linear transformation on the source-side vector sequence, to obtain a request vector sequence, a key vector sequence, and a value vector sequence corresponding to the source-side vector sequence;
   calculating, by the device, a logical similarity between the request vector sequence and the key vector sequence;
   constructing, by the device, a local strength matrix according to the request vector sequence;
   performing, by the device, nonlinear transformation based on the logical similarity and the local strength matrix, to obtain a local strength attention weight distribution corresponding to elements in the input sequence; and
   fusing, by the device, value vectors in the value vector sequence according to the local strength attention weight distribution, to obtain a network representation sequence corresponding to the input sequence.

2. The method according to claim 1, wherein constructing the local strength matrix according to the request vector sequence comprises:
   determining, by the device according to the request vector sequence, a center point corresponding to each element;
   determining, by the device according to the request vector sequence, a window size corresponding to each element;
   determining, by the device, a locally strengthened range corresponding to each element according to the center point and the window size; and
   calculating, by the device, strong and weak connections between every two elements based on the locally strengthened range, to obtain the local strength matrix.

3. The method according to claim 2, wherein determining, according to the request vector sequence, the center point corresponding to each element comprises:
   performing, by the device using a first feedforward neural network for each element in the input sequence, transformation on a request vector corresponding to the element in the request vector sequence, to obtain a first scalar corresponding to the element;
   performing, by the device, nonlinear transformation on the first scalar by using a nonlinear transformation function, to obtain a second scalar proportional to an input sequence length; and
   using, by the device, the second scalar as the center point of the locally strengthened range corresponding to the element.

4. The method according to claim 2, wherein determining, according to the request vector sequence, the window size corresponding to each element comprises:
   performing, by the device using a second feedforward neural network for each element in the input sequence, linear transformation on a request vector corresponding to the element in the request vector sequence, to obtain a third scalar corresponding to the element;
   performing, by the device, nonlinear transformation on the third scalar by using a nonlinear transformation function, to obtain a fourth scalar proportional to an input sequence length; and
   using, by the device, the fourth scalar as the window size of the locally strengthened range corresponding to the element.

5. The method according to claim 2, wherein:
   determining the locally strengthened range corresponding to each element according to the center point and the window size comprises:
      using, by the device, the center point as an expectation of a Gaussian distribution, and using the window size as a variance of the Gaussian distribution, and
      determining, by the device, a locally strengthened range according to the Gaussian distribution determined according to the expectation and the variance; and
   calculating strong and weak connections between every two elements based on the locally strengthened range, to obtain the local strength matrix comprises:
      sequentially arranging, by the device, the strong and weak connections between every two elements according to a sequence of the elements in the input sequence, to obtain the local strength matrix, the strong and weak connections between every two elements being obtained by using the following formula:

$$G_{ij} = -\frac{2(j - P_i)^2}{D_i^2},$$

wherein
      $G_{ij}$ represents a strong and weak connection between a $j^{th}$ element in the input sequence and a center point $P_i$ corresponding to an $i^{th}$ element, and $G_{ij}$ is a value of a $j^{th}$ element of an $i^{th}$ column vector in a local strength matrix G;
      $P_i$ represents a center point of a locally strengthened range corresponding to the $i^{th}$ element; and
      $D_i$ represents a window size of the locally strengthened range corresponding to the $i^{th}$ element.

6. The method according to claim 1, wherein constructing the local strength matrix according to the request vector sequence comprises:
   determining, by the device according to the request vector sequence, a center point corresponding to each element;
   determining, by the device, a uniform window size according to the key vector sequence;
   determining, by the device, a locally strengthened range corresponding to each element according to the center point and the window size; and
   calculating, by the device, strong and weak connections between every two elements based on the locally strengthened range, to obtain the local strength matrix.

7. The method according to claim 6, wherein determining the uniform window size according to the key vector sequence comprises:
   obtaining, by the device, key vectors in the key vector sequence;
   calculating, by the device, an average value of the key vectors;
   performing, by the device, linear transformation on the average value to obtain a fifth scalar;

performing, by the device, nonlinear transformation on the fifth scalar by using a nonlinear transformation function, to obtain a sixth scalar proportional to an input sequence length; and using, by the device, the sixth scalar as the uniform window size of the locally strengthened range.

8. An apparatus for generating network representation for a neural network, the apparatus comprising:
a memory storing instructions; and
a processor in communication with the memory, wherein, when the processor executes the instructions, the processor is configured to cause the apparatus to:
obtain a source-side vector sequence corresponding to an input sequence,
perform linear transformation on the source-side vector sequence, to obtain a request vector sequence, a key vector sequence, and a value vector sequence corresponding to the source-side vector sequence,
calculate a logical similarity between the request vector sequence and the key vector sequence,
construct a local strength matrix according to the request vector sequence, perform nonlinear transformation based on the logical similarity and the local strength matrix, to obtain a local strength attention weight distribution corresponding to elements in the input sequence, and
fuse value vectors in the value vector sequence according to the local strength attention weight distribution, to obtain a network representation sequence corresponding to the input sequence.

9. The apparatus according to claim 8, wherein, when the processor is configured to cause the apparatus to construct the local strength matrix according to the request vector sequence, the processor is configured to cause the apparatus to:
determine, according to the request vector sequence, a center point corresponding to each element;
determine, according to the request vector sequence, a window size corresponding to each element;
determine a locally strengthened range corresponding to each element according to the center point and the window size; and
calculate strong and weak connections between every two elements based on the locally strengthened range, to obtain the local strength matrix.

10. The apparatus according to claim 9, wherein, when the processor is configured to cause the apparatus to determine, according to the request vector sequence, the center point corresponding to each element, the processor is configured to cause the apparatus to:
perform, using a first feedforward neural network for each element in the input sequence, transformation on a request vector corresponding to the element in the request vector sequence, to obtain a first scalar corresponding to the element;
perform nonlinear transformation on the first scalar by using a nonlinear transformation function, to obtain a second scalar proportional to an input sequence length; and
use the second scalar as the center point of the locally strengthened range corresponding to the element.

11. The apparatus according to claim 9, wherein, when the processor is configured to cause the apparatus to determine, according to the request vector sequence, the window size corresponding to each element, the processor is configured to cause the apparatus to:

perform, using a second feedforward neural network for each element in the input sequence, linear transformation on a request vector corresponding to the element in the request vector sequence, to obtain a third scalar corresponding to the element;
perform nonlinear transformation on the third scalar by using a nonlinear transformation function, to obtain a fourth scalar proportional to an input sequence length; and
use the fourth scalar as the window size of the locally strengthened range corresponding to the element.

12. The apparatus according to claim 9, wherein:
when the processor is configured to cause the apparatus to determine the locally strengthened range corresponding to each element according to the center point and the window size, the processor is configured to cause the apparatus to:
use the center point as an expectation of a Gaussian distribution, and use the window size as a variance of the Gaussian distribution, and
determine a locally strengthened range according to the Gaussian distribution determined according to the expectation and the variance; and
when the processor is configured to cause the apparatus to calculate strong and weak connections between every two elements based on the locally strengthened range, to obtain the local strength matrix, the processor is configured to cause the apparatus to:
sequentially arrange the strong and weak connections between every two elements according to a sequence of the elements in the input sequence, to obtain the local strength matrix, the strong and weak connections between every two elements being obtained by using the following formula:

$$G_{ij} = -\frac{2(j - P_i)^2}{D_i^2},$$

wherein
$G_{ij}$ represents a strong and weak connection between a $j^{th}$ element in the input sequence and a center point $P_i$ corresponding to an $i^{th}$ element, and $G_{ij}$ is a value of a $j^{th}$ element of an $i^{th}$ column vector in a local strength matrix G;
$P_i$ represents a center point of a locally strengthened range corresponding to the $i^{th}$ element; and
$D_i$ represents a window size of the locally strengthened range corresponding to the $i^{th}$ element.

13. The apparatus according to claim 8, wherein, when the processor is configured to cause the apparatus to construct the local strength matrix according to the request vector sequence, the processor is configured to cause the apparatus to:
determine, according to the request vector sequence, a center point corresponding to each element;
determine a uniform window size according to the key vector sequence;
determine a locally strengthened range corresponding to each element according to the center point and the window size; and
calculate strong and weak connections between every two elements based on the locally strengthened range, to obtain the local strength matrix.

14. The apparatus according to claim 13, wherein, when the processor is configured to cause the apparatus to determine the uniform window size according to the key vector sequence, the processor is configured to cause the apparatus to:

obtain key vectors in the key vector sequence;

calculate an average value of the key vectors;

perform linear transformation on the average value to obtain a fifth scalar;

perform nonlinear transformation on the fifth scalar by using a nonlinear transformation function, to obtain a sixth scalar proportional to an input sequence length; and use the sixth scalar as the uniform window size of the locally strengthened range.

15. A non-transitory computer readable storage medium storing computer readable instructions, wherein, the computer readable instructions, when executed by a processor, are configured to cause the processor to perform:

obtaining a source-side vector sequence corresponding to an input sequence;

performing linear transformation on the source-side vector sequence, to obtain a request vector sequence, a key vector sequence, and a value vector sequence corresponding to the source-side vector sequence;

calculating a logical similarity between the request vector sequence and the key vector sequence;

constructing a local strength matrix according to the request vector sequence;

performing nonlinear transformation based on the logical similarity and the local strength matrix, to obtain a local strength attention weight distribution corresponding to elements in the input sequence; and fusing value vectors in the value vector sequence according to the local strength attention weight distribution, to obtain a network representation sequence corresponding to the input sequence.

16. The non-transitory computer readable storage medium according to claim 15, wherein, when the computer readable instructions are configured to cause the processor to perform constructing the local strength matrix according to the request vector sequence, the computer readable instructions are configured to cause the processor to perform:

determining, according to the request vector sequence, a center point corresponding to each element;

determining, according to the request vector sequence, a window size corresponding to each element;

determining a locally strengthened range corresponding to each element according to the center point and the window size; and calculating strong and weak connections between every two elements based on the locally strengthened range, to obtain the local strength matrix.

17. The non-transitory computer readable storage medium according to claim 16, wherein, when the computer readable instructions are configured to cause the processor to perform determining, according to the request vector sequence, the center point corresponding to each element, the computer readable instructions are configured to cause the processor to perform:

performing, using a first feedforward neural network for each element in the input sequence, transformation on a request vector corresponding to the element in the request vector sequence, to obtain a first scalar corresponding to the element;

performing nonlinear transformation on the first scalar by using a nonlinear transformation function, to obtain a second scalar proportional to an input sequence length; and using the second scalar as the center point of the locally strengthened range corresponding to the element.

18. The non-transitory computer readable storage medium according to claim 16, wherein, when the computer readable instructions are configured to cause the processor to perform determining, according to the request vector sequence, the window size corresponding to each element, the computer readable instructions are configured to cause the processor to perform:

performing, using a second feedforward neural network for each element in the input sequence, linear transformation on a request vector corresponding to the element in the request vector sequence, to obtain a third scalar corresponding to the element;

performing nonlinear transformation on the third scalar by using a nonlinear transformation function, to obtain a fourth scalar proportional to an input sequence length; and using the fourth scalar as the window size of the locally strengthened range corresponding to the element.

19. The non-transitory computer readable storage medium according to claim 16, wherein:

when the computer readable instructions are configured to cause the processor to perform determining the locally strengthened range corresponding to each element according to the center point and the window size, the computer readable instructions are configured to cause the processor to perform:

using the center point as an expectation of a Gaussian distribution, and using the window size as a variance of the Gaussian distribution, and determining a locally strengthened range according to the Gaussian distribution determined according to the expectation and the variance; and when the computer readable instructions are configured to cause the processor to perform calculating strong and weak connections between every two elements based on the locally strengthened range, to obtain the local strength matrix, the computer readable instructions are configured to cause the processor to perform:

sequentially arranging the strong and weak connections between every two elements according to a sequence of the elements in the input sequence, to obtain the local strength matrix, the strong and weak connections between every two elements being obtained by using the following formula:

$$G_{ij} = -\frac{2(j - P_i)^2}{D_i^2},$$

wherein $G_{ij}$ represents a strong and weak connection between a $j^{th}$ element in the input sequence and a center point $P_i$ corresponding to an $i^{th}$ element, and $G_{ij}$ is a value of a $j^{th}$ element of an $i^{th}$ column vector in a local strength matrix G;

$P_i$ represents a center point of a locally strengthened range corresponding to the $i^{th}$ element; and $D_i$ represents a window size of the locally strengthened range corresponding to the $i^{th}$ element.

20. The non-transitory computer readable storage medium according to claim 15, wherein, when the computer readable instructions are configured to cause the processor to perform constructing the local strength matrix according to the request vector sequence, the computer readable instructions are configured to cause the processor to perform:
- determining, according to the request vector sequence, a center point corresponding to each element;
- determining a uniform window size according to the key vector sequence;
- determining a locally strengthened range corresponding to each element according to the center point and the window size; and
- calculating strong and weak connections between every two elements based on the locally strengthened range, to obtain the local strength matrix.

* * * * *